United States Patent
Zhang et al.

(10) Patent No.: US 12,184,562 B2
(45) Date of Patent: Dec. 31, 2024

(54) COMMUNICATION METHOD AND APPARATUS

(71) Applicant: HUAWEI TECHNOLOGIES CO., LTD., Guangdong (CN)

(72) Inventors: Qian Zhang, Beijing (CN); Meng Deng, Beijing (CN); Daoming Liu, Beijing (CN); Peng Gao, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 361 days.

(21) Appl. No.: 17/672,088

(22) Filed: Feb. 15, 2022

(65) Prior Publication Data

US 2022/0173845 A1  Jun. 2, 2022

Related U.S. Application Data

(63) Continuation of application No. PCT/CN2019/101192, filed on Aug. 16, 2019.

(51) Int. Cl.
*H04W 56/00* (2009.01)
*H04L 5/00* (2006.01)
*H04W 8/24* (2009.01)
*H04W 72/0453* (2023.01)

(52) U.S. Cl.
CPC .............. *H04L 5/001* (2013.01); *H04W 8/24* (2013.01); *H04W 72/0453* (2013.01)

(58) Field of Classification Search
CPC ...... H04L 5/001; H04W 8/24; H04W 72/0453
USPC ........................................................ 370/330
See application file for complete search history.

(56) References Cited

U.S. PATENT DOCUMENTS

| | | | |
|---|---|---|---|
| 2010/0238873 A1* | 9/2010 | Asanuma | H04L 5/0091 370/329 |
| 2019/0159134 A1 | 5/2019 | Wang et al. | |
| 2019/0182898 A1* | 6/2019 | Yu | H04B 7/00 |
| 2020/0359199 A1* | 11/2020 | Takahashi | H04L 5/001 |

(Continued)

FOREIGN PATENT DOCUMENTS

| | | |
|---|---|---|
| CN | 108076522 A | 5/2018 |
| CN | 109429558 A | 3/2019 |

OTHER PUBLICATIONS

Huawei, HiSilicon, Draft CR for 38.101-2: frequency separation class, 3GPP TSG-RAN WG4 Meeting #90bis, R4-1904472, Xi an, China, Apr. 8-12, 2019, 3 Pages.

(Continued)

*Primary Examiner* — Sai Ming Chan
(74) *Attorney, Agent, or Firm* — WOMBLE BOND DICKINSON (US) LLP

(57) ABSTRACT

This application relates to the field of communication technologies, and discloses a communication method and apparatus. The method includes: The terminal device generates capability information, where the capability information includes an overall frequency separation class of the terminal device, and the overall frequency separation class indicates a maximum frequency separation between a lowest component carrier and a highest component carrier included in an uplink component carrier and a downlink component carrier supported by the terminal device; and the terminal device sends the capability information to the network device.

20 Claims, 12 Drawing Sheets

(56) References Cited

U.S. PATENT DOCUMENTS

2021/0314112 A1* 10/2021 Balasubramanian ... H04L 5/001

OTHER PUBLICATIONS

RAN WG4, Draft LS on mmWave UE NC CA capability signalling, 3GPP TSG-RAN WG4 Meeting #84Bis, R4-1711623, Dubrovnik, Croatia, Oct. 9-13, 2017, 1 Page.
3GPP TS 38.306 V15.2.0 (Jun. 2018), 3rd Generation Partnership Project; Technical Specification Group Radio Access Network;NR;User Equipment (UE) radio access capabilities(Release 15), total 28 pages.
3GPP TS 38.101-1 V0.0.1 (Aug. 2017), 3rd Generation Partnership Project; Technical Specification Group Radio Access Network;NR; User Equipment (UE) radio transmission and reception; Part 1: Range 1 Standalone(Release 15), 11 pages.
3GPP TS 38.331 V0.1.0 (Oct. 2017), 3rd Generation Partnership Project; Technical Specification Group Radio Access Network; NR;Radio Resource Control (RRC);Protocol specification(Release 15), total 42 pages.
Huawei et al: "On separation class UE capability for FR2",3GPP Draft; R4-1904471 on Separation Class UE Capabilityfor FR2, 3rd Generation Partnership Project (3GPP),Mobile Competence Centre ; 650, Route Des Lucioles ;F-06921 Sophia-Antipolis Cedex ; FRANCvol. RAN WG4, No. Athens, Greece; Feb. 25, 2019-Mar. 1, 2019 Apr. 1, 2019(Apr. 1, 2019), XP051714813.
TSG RAN WG4: "Reply LS on frequency separation class", 3GPP Draft; R4-1814466_Repl yLS_Freqsep Final, 3rdGeneration Partnership Project (3GPP), MobileCompetence Centre ; 650, Route Des Lucioles ; F-06921Sophia-Antipolis Cedex ; FranceNo. Spokane, US; Nov. 12, 2018-Nov. 16, 2018 Nov. 11, 2018 (Nov. 11, 2018),XP051558873.
RAN2: "LS on frequency separation class",3GPP Draft; R4-1814408_R2-1816016, 3rd GenerationPartnership Project (3GPP), Mobile Competence Centre ;650, Route Des Lucioles ; F-06921 Sophia-Antipolis Cedex ;Francevol. RAN WG4, No. Spokane, US; Nov. 12, 2018-Nov. 16, 2018 Nov. 11, 2018 (Nov. 11, 2018), XP051558823,Retrieved from the Internet:URL:http://www.3gpp.org/ftp/Meetings%5F3GPP%5FSYNC/RAN4/Docs/R4%2D1814408%2Ezip[retrieved on Nov. 11, 2018].
Huawei et al: "Draft CR for 38.101-2: frequency separation class",3GPP Draft; R4-1905005 Draft CR for 38.101-2 FrequencySeparation Class, 3rd Generation Partnership PROJECT(3GPP), Mobile Competence Centre ; 650, Route DesLucioles ; F-06921 Sophia-Antipolis Cedexvol. RAN WG4, No. Xi'an, China; Apr. 8, 2019-Apr. 12, 2019 Apr. 15, 2019(Apr. 15, 2019).
Huawei et al: "On separation class signalling in Rel-16",3GPP Draft; R4-1912400 on Separation Class Signalling forFR2, 3rd Generation Partnership Project (3GPP), MobileCompetence Centre ; 650, Route Des Lucioles ; F-06921Sophia-Antipolis Cedex ; Francevol. RAN WG4, No. Chongqing, China; Oct. 14, 2019-Oct. 18, 2019 Oct. 4, 2019 (Oct. 4, 2019), XP051794606.

* cited by examiner

Downlink channel (receive channel)

An uplink channel and a downlink channel share one LO

COMMUNICATION METHOD AND APPARATUS

CROSS-REFERENCE TO RELATED APPLICATIONS

This application is a continuation of International Application No. PCT/CN2019/101192, filed on Aug. 16, 2019, the disclosure of which is hereby incorporated by reference in its entirety.

TECHNICAL FIELD

This application relates to the field of communication technologies, and in particular, to a communication method and apparatus.

BACKGROUND

To increase transmission bandwidth and meet a user's requirement for increasing a peak rate, an existing terminal device has already supported access to a plurality of component carriers (CC), so that the transmission bandwidth is increased in scenarios such as carrier aggregation (CA) and dual connectivity (DC) of the terminal device. In addition, because out-of-band interference of millimeter waves (FR2) is relatively small, to reduce power consumption of the terminal device, one transceiver channel may be used during implementation to support both receiving and sending of a plurality of CCs configured by a network device for the terminal device. Moreover, because the FR2 has a relatively high operating frequency and rich spectrum resources, and beamforming and large bandwidth are introduced, power consumption of the terminal device is relatively large. A radio frequency (RF) in which a transmitter and a receiver share a local oscillator (LO) may be used, to be particular, an uplink channel (transmit channel) and a downlink channel (receive channel) of the transceiver channel that supports the receiving and sending of the plurality of CCs share the LO, where all uplink CCs and downlink CCs correspond to a same LO location at the same time, so that power consumption of the terminal device caused by a phase-locked loop (PLL) can be reduced.

In an architecture design in which a plurality of CCs are sent and received by using one transceiver channel, the terminal device needs to report, to the network device, a frequency separation class that can be supported by the transceiver channel, so that the network device configures operating frequencies and bandwidth of the uplink CC and the downlink CC for the terminal device. Because an uplink frequency separation class and a downlink frequency separation class of the terminal device are related to RF and a baseband (BB), when bandwidth supported by the RF and/or the BB of the transceiver channel is different in uplink and downlink, an uplink frequency separation class and a downlink frequency separation class supported by the transceiver channel may also be different. Therefore, it is specified in an existing protocol that the terminal device separately reports the frequency separation classes in uplink and downlink.

However, it is not specified in the protocol that the bandwidth and center frequencies that are of the uplink CC and the downlink CC and that are configured by the network device for the terminal device need to be the same. The bandwidth and the center frequencies of the uplink CC and the downlink CC are separately configured by the network device for the terminal device, and are not associated with each other. Therefore, the bandwidth and the center frequencies of the uplink CC and the downlink CC may be differently configured. Because the transceiver channel shares the LO, an overall frequency separation that is configured by the network device for the terminal device and that includes the uplink CC and downlink CC exceeds a maximum uplink frequency separation and a maximum downlink frequency separation that are indicated by the uplink frequency separation class and the downlink frequency separation class reported by the terminal device. Consequently, a capability reported by the terminal device does not match a configuration delivered by the network device.

SUMMARY

This application provides a communication method and apparatus, to resolve a problem in a conventional technology that a capability reported by a terminal device does not match a configuration delivered by a network device because capability information reported by the terminal device is incomplete.

According to a first aspect, an embodiment of this application provides a communication method. The method includes: A terminal device generates capability information, where the capability information includes an overall frequency separation class of the terminal device, and the overall frequency separation class indicates a maximum frequency separation between a lowest component carrier and a highest component carrier included in an uplink component carrier and a downlink component carrier supported by the terminal device. The terminal device sends the capability information to a network device.

The communication method described in this embodiment of this application and implemented by the terminal device may alternatively be implemented by a component of the terminal device, for example, implemented by a processing chip or a circuit in the terminal device. According to the foregoing method, the capability information sent/reported by the terminal device to the network device includes the overall frequency separation class used to indicate the maximum frequency separation between the lowest component carrier and the highest component carrier included in the uplink component carrier and the downlink component carrier supported by the terminal device, to avoid a problem that, because the network device configures the uplink component carrier and the downlink component carrier for the terminal device based only on an uplink frequency separation class and a downlink frequency separation class of the terminal device, an overall frequency separation of the uplink component carrier and the downlink component carrier exceeds a maximum uplink frequency separation and a maximum downlink frequency separation indicated by the uplink frequency separation class and the downlink frequency separation class and the terminal device cannot provide support, thereby avoiding a problem that a capability reported by the terminal device does not match a configuration delivered by the network device.

In one embodiment, the capability information further includes terminal device type indication information, where the terminal device type indication information includes a first terminal device type identifier or a second terminal device type identifier, where the first terminal device type identifier indicates that the uplink frequency separation class and the downlink frequency separation class of the terminal device are the same, and the second terminal device type identifier indicates that the uplink frequency separation class and the downlink frequency separation class of the terminal device are different. In the foregoing embodiment, the terminal device type indication information is introduced into the capability information to indicate whether the uplink frequency separation class and the downlink frequency separation class of the terminal device are the same. When the uplink frequency separation class and the downlink frequency separation class of the terminal device are the same, both the uplink frequency separation class and the downlink frequency separation class of the terminal device are the same as the overall frequency separation class of the terminal device. In this case, the capability information may not include the uplink frequency separation class and the downlink frequency separation class of the terminal device, thereby reducing signaling overheads.

In one embodiment, when the terminal device type indication information includes the second terminal device type identifier, the capability information further includes the uplink frequency separation class and the downlink frequency separation class of the terminal device. In the foregoing embodiment, when the uplink frequency separation class and the downlink frequency separation class of the terminal device are different from the overall frequency separation class of the terminal device, the terminal device sends the uplink frequency separation class and the downlink frequency separation class of the terminal device to the network device by using the capability information, to ensure that the network device accurately configures the uplink component carrier and the downlink component carrier for the terminal device.

In one embodiment, the uplink component carrier and the downlink component carrier supported by the terminal device are located in a band combination including one or more bands. In the foregoing embodiment, the overall frequency separation class, the uplink frequency separation class, and the downlink frequency separation class of the terminal device can be reported when the uplink component carrier and the downlink component carrier are located in a same band (that is, are intra-band) or in different bands (that is, are inter-band). This extends the application scope of the communication method, and further avoids the problem that the overall frequency separation of the uplink component carrier and the downlink component carrier configured by the network device for the terminal device exceeds the maximum uplink frequency separation and the maximum downlink frequency separation indicated by the uplink frequency separation class and the downlink frequency separation class and the terminal device cannot provide support. Therefore, it is ensured that the capability reported by the terminal device matches the configuration delivered by the network device.

In one embodiment, that a terminal device generates capability information includes: The terminal device generates, for one or more transceiver channels, one or more pieces of capability information corresponding one-to-one to the one or more transceiver channels. In the foregoing embodiment, when a spectrum separation in scenarios such as intra-band CA/DC and inter-band CA/DC increases, and the terminal device cannot provide support by using one transceiver channel, the terminal device may report capability information of a plurality of transceiver channels to the network device, and use the plurality of transceiver channels to support the intra-band CA/DC, the inter-band CA/DC, or the like having a relatively large frequency separation. In this way, a capability of communication between the terminal device and the network device is improved.

According to a second aspect, an embodiment of this application provides a communication method. The method includes: A terminal device generates capability information, where the capability information includes an uplink frequency separation class and a downlink frequency separation class of the terminal device in a band combination including a plurality of bands. The terminal device sends the capability information to a network device.

The communication method described in this embodiment of this application and implemented by the terminal device may alternatively be implemented by a component of the terminal device, for example, implemented by a processing chip or a circuit in the terminal device. According to the foregoing method, the terminal device may report the uplink frequency separation class and the downlink frequency separation class of the plurality of bands as a whole per band combination. For example, in the inter-band CA scenario, the terminal device may report the uplink frequency separation class and the downlink frequency separation class of the plurality of bands as a whole. This reduces signaling overheads and enriches a manner of reporting the capability information.

In one embodiment, that a terminal device generates capability information includes: The terminal device generates, for one or more transceiver channels, one or more pieces of capability information corresponding one-to-one to the one or more transceiver channels. In the foregoing embodiment, when a spectrum separation in scenarios such as inter-band CA/DC increases, and the terminal device cannot provide support by using one transceiver channel, the terminal device may report capability information of a plurality of transceiver channels to the network device, and use the plurality of transceiver channels to support the inter-band CA/DC or the like having a relatively large frequency separation. In this way, a capability of communication between the terminal device and the network device is extended.

According to a third aspect, an embodiment of this application provides a communication method. The method includes: A network device receives capability information from a terminal device, where the capability information includes an overall frequency separation class of the terminal device, and the overall frequency separation class indicates a maximum frequency separation between a lowest component carrier and a highest component carrier included in an uplink component carrier and a downlink component carrier supported by the terminal device. The network device configures the uplink component carrier and the downlink component carrier for the terminal device based on the capability information.

The communication method described in this embodiment of this application and implemented by the network device may alternatively be implemented by a component of the network device, for example, implemented by a processing chip or a circuit in the network device. According to the foregoing method, the capability information sent/reported by the terminal device to the network device includes overall frequency separation information used to indicate the maximum frequency separation between the lowest component carrier and the highest component carrier included in the uplink component carrier and the downlink component carrier supported by the terminal device, to avoid a problem that, because the network device configures the uplink component carrier and the downlink component carrier for the terminal device based only on an uplink frequency separation class and a downlink frequency separation class of the terminal device, an overall frequency separation of the uplink component carrier and the downlink component carrier exceeds a maximum uplink frequency separation and a maximum downlink frequency separation indicated by the uplink frequency separation class and the downlink frequency separation class and the terminal device cannot provide support, thereby avoiding a problem that a capability reported by the terminal device does not match a configuration delivered by the network device.

In one embodiment, the capability information further includes terminal device type indication information, where the terminal device type indication information includes a first terminal device type identifier or a second terminal device type identifier, where the first terminal device type identifier indicates that the uplink frequency separation class and the downlink frequency separation class of the terminal device are the same, and the second terminal device type identifier indicates that the uplink frequency separation class and the downlink frequency separation class of the terminal device are different. In the foregoing embodiment, the terminal device type indication information is introduced into the capability information to indicate whether the uplink frequency separation class and the downlink frequency separation class of the terminal device are the same. When the uplink frequency separation class and the downlink frequency separation class of the terminal device are the same, both the uplink frequency separation class and the downlink frequency separation class of the terminal device are the same as the overall frequency separation class of the terminal device. In this case, the capability information may not include the uplink frequency separation class and the downlink frequency separation class of the terminal device, thereby reducing signaling overheads.

In one embodiment, when the terminal device type indication information includes the second terminal device type identifier, the capability information further includes the uplink frequency separation class and the downlink frequency separation class of the terminal device. In the foregoing embodiment, when the uplink frequency separation class and the downlink frequency separation class of the terminal device are different from the overall frequency separation class of the terminal device, the terminal device sends the uplink frequency separation class and the downlink frequency separation class of the terminal device to the network device by using the capability information, to ensure that the network device accurately configures the uplink component carrier and the downlink component carrier for the terminal device.

In one embodiment, the uplink component carrier and the downlink component carrier supported by the terminal device are located in a band combination including one or more bands. In the foregoing embodiment, the overall frequency separation class, the uplink frequency separation class, and the downlink frequency separation class of the terminal device can be reported when the uplink component carrier and the downlink component carrier are located in a same band or different bands. This extends the application scope of the communication method, and further avoids the problem that the overall frequency separation of the uplink component carrier and the downlink component carrier configured by the network device for the terminal device exceeds the maximum uplink frequency separation and the maximum downlink frequency separation indicated by the uplink frequency separation class and the downlink frequency separation class and the terminal device cannot provide support. Therefore, it is ensured that the capability reported by the terminal device matches the configuration delivered by the network device.

In one embodiment, that a network device receives capability information from a terminal device includes: The network device receives one or more pieces of capability information corresponding one-to-one to one or more transceiver channels of the terminal device. That the network device configures the uplink component carrier and the downlink component carrier for the terminal device based on the capability information includes: The network device configures the uplink component carrier and the downlink component carrier for the one or more transceiver channels of the terminal device based on the one or more pieces of capability information corresponding one-to-one to the one or more transceiver channels of the terminal device. In the foregoing embodiment, when a spectrum separation in scenarios such as intra-band CA/DC and inter-band CA/DC increases, and the terminal device cannot provide support by using one transceiver channel, the terminal device may report capability information of a plurality of transceiver channels to the network device, and use the plurality of transceiver channels to support the intra-band CA/DC, the inter-band CA/DC, or the like having a relatively large frequency separation. In this way, a capability of communication between the terminal device and the network device is extended.

According to a fourth aspect, an embodiment of this application provides a communication method. The method includes: A network device receives capability information from a terminal device, where the capability information includes an uplink frequency separation class and a downlink frequency separation class of the terminal device in a band combination including a plurality of bands. The network device configures an uplink component carrier and a downlink component carrier for the terminal device based on the capability information.

The communication method described in this embodiment of this application and implemented by the network device may alternatively be implemented by a component of the network device, for example, implemented by a processing chip or a circuit in the network device. According to the foregoing method, the terminal device may report the uplink frequency separation class and the downlink frequency separation class of the plurality of bands as a whole per band combination. For example, in an inter-band CA scenario, the network device may report the uplink frequency separation class and the downlink frequency separation class of the plurality of bands as a whole. This reduces signaling overheads and enriches a manner of reporting the capability information.

In one embodiment, that a network device receives capability information from a terminal device includes: The network device receives one or more pieces of capability information corresponding one-to-one to one or more transceiver channels of the terminal device. That the network device configures an uplink component carrier and a downlink component carrier for the terminal device based on the capability information includes: The network device configures the uplink component carrier and the downlink component carrier for the one or more transceiver channels of the terminal device based on the one or more pieces of capability information corresponding one-to-one to the one or more transceiver channels of the terminal device. In the foregoing embodiment, when a spectrum separation in the inter-band CA/DC scenario increases, and the terminal device cannot provide support by using one transceiver channel, the terminal device may report capability information of a plurality of transceiver channels to the network device, and use the plurality of transceiver channels to support the inter-band CA/DC or the like having a relatively large frequency separation. In this way, a capability of communication between the terminal device and the network device is extended.

According to a fifth aspect, an embodiment of this application provides a communication apparatus. The apparatus has a function of implementing the method according to any one of the first aspect or the embodiments of the first aspect, or a function of implementing the method according to any one of the second aspect or the embodiments of the second aspect. The function may be implemented by hardware, or may be implemented by hardware executing corresponding software. The hardware or the software includes one or more modules corresponding to the foregoing function, for example, a transceiver unit and a processing unit.

In one embodiment, the apparatus may be a chip or an integrated circuit.

In one embodiment, the apparatus includes a memory and a processor. The memory is configured to store a program executed by the processor. When the program is executed by the processor, the apparatus may perform the method according to any one of the first aspect or the embodiments of the first aspect, or perform the method according to any one of the second aspect or the embodiments of the second aspect.

In one embodiment, the apparatus may be a terminal device.

According to a sixth aspect, an embodiment of this application provides a communication apparatus. The apparatus has a function of implementing the method according to any one of the third aspect or the embodiments of the third aspect, or a function of implementing the method according to any one of the fourth aspect or the embodiments of the fourth aspect. The function may be implemented by hardware, or may be implemented by hardware executing corresponding software. The hardware or the software includes one or more modules corresponding to the foregoing function, for example, a transceiver unit and a processing unit.

In one embodiment, the apparatus may be a chip or an integrated circuit.

In one embodiment, the apparatus includes a memory and a processor. The memory is configured to store a program executed by the processor. When the program is executed by the processor, the apparatus may perform the method according to any one of the third aspect or the embodiments of the third aspect, or perform the method according to any one of the fourth aspect or the embodiments of the fourth aspect.

In one embodiment, the apparatus may be a network device.

According to a seventh aspect, an embodiment of this application provides a communication system. The communication system may include a terminal device and a network device, where the terminal device may be configured to perform the method according to any one of the first aspect or the embodiments of the first aspect, and the network device may be configured to perform the method according to any one of the third aspect or the embodiments of the third aspect.

According to an eighth aspect, an embodiment of this application provides a communication system. The communication system may include a terminal device and a network device, where the terminal device may be configured to perform the method according to any one of the second aspect or the embodiments of the second aspect, and the network device may be configured to perform the method according to any one of the fourth aspect or the embodiments of the fourth aspect.

According to a ninth aspect, an embodiment of this application provides a computer-readable storage medium. The storage medium stores computer instructions; and when the computer instructions are executed, the method according to any one of the first aspect or the embodiments of the first aspect may be implemented, or the method according to any one of the second aspect or the embodiments of the second aspect may be implemented, or the method according to any one of the third aspect or the embodiments of the third aspect may be implemented, or the method according to any one of the fourth aspect or the embodiments of the fourth aspect may be implemented.

According to a tenth aspect, an embodiment of this application further provides a computer program product, including a computer program or instructions. When the computer program or the instructions is/are executed, the method according to any one of the first aspect or the embodiments of the first aspect may be implemented, or the method according to any one of the second aspect or the embodiments of the second aspect may be implemented, or the method according to any one of the third aspect or the embodiments of the third aspect may be implemented, or the method according to any one of the fourth aspect or the embodiments of the fourth aspect may be implemented.

According to an eleventh aspect, an embodiment of this application further provides a chip. The chip is coupled to a memory, and is configured to read and execute program instructions stored in the memory, to implement the method according to any one of the first aspect or the embodiments of the first aspect, or the method according to any one of the second aspect or the embodiments of the second aspect, or the method according to any one of the third aspect or the embodiments of the third aspect, or the method according to any one of the fourth aspect or the embodiments of the fourth aspect.

DESCRIPTION OF EMBODIMENTS

The following describes in detail the embodiments of this application with reference to the accompanying drawings.

Figure 1:
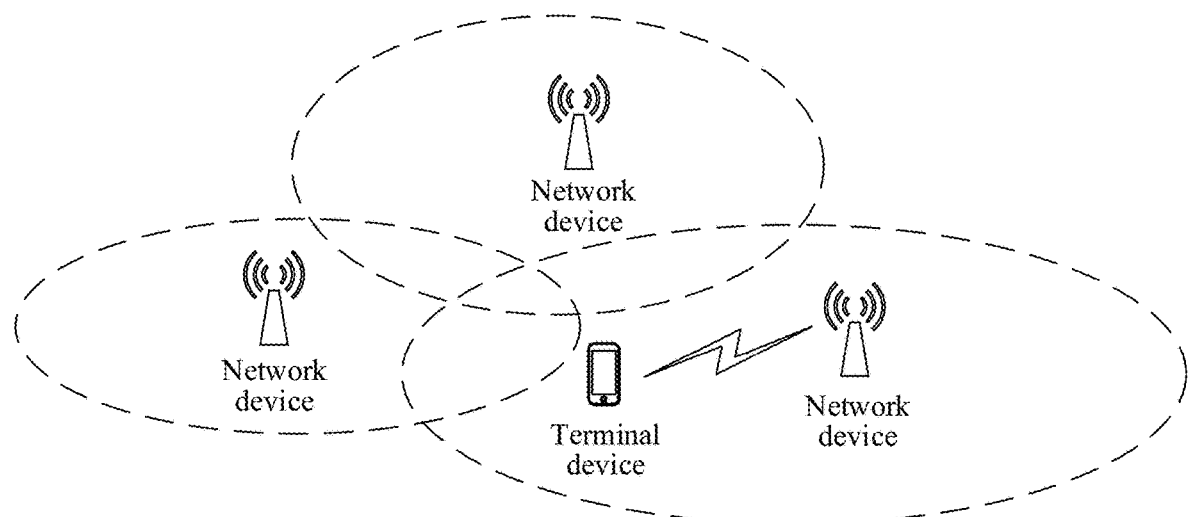
FIG. 1 is a schematic diagram of a communication architecture according to an embodiment of this application.

Technical solutions in the embodiments of this application may be applied to various communication systems such as a 5th generation (5G) communication system and a long term evolution-advanced (LTE-A) system, and may further be applied to related cellular systems such as a wireless fidelity (Wi-Fi) system and a worldwide interoperability for microwave access (WiMAX) system, and future communication systems such as a 6G system. The technical solutions in the embodiments of this application may be applied to a CA scenario, a DC scenario, and the like. As shown in FIG. 1, an architecture of a communication system to which the embodiments of this application are applicable may include at least one network device and a terminal device. Three network devices are used as an example in FIG. 1. Each network device may have one or more carriers. Generally, each carrier corresponds to one cell. The terminal device may access a plurality of carriers of a same network device, or may access a plurality of carriers of different network devices. When the terminal device accesses a plurality of carriers, each carrier accessed by the terminal device is one CC accessed by the terminal device.

Figure 2A:
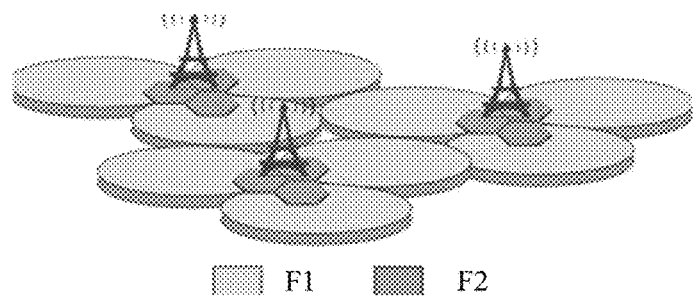
FIG. 2A to FIG. 2D each are a schematic diagram of a scenario in which a terminal device accesses a plurality of component carriers according to an embodiment of this application.

For example, as shown in FIG. 2A, a carrier F1 and a carrier F2 share a site and have same coverage (carriers that are of a same network device and whose coverage is the same or approximately the same). The carrier F1 and the carrier F2 may be located in a same band. The terminal device may simultaneously access the carrier F1 and the carrier F2 in an overlapping area between the coverage of the carrier F1 and the carrier F2. The carrier F1 and the carrier F2 are used as CCs accessed by the terminal device.

Figure 2B:
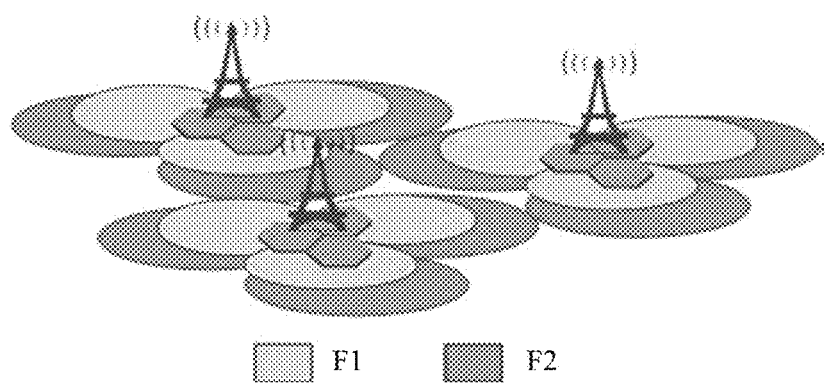
Figure 2C:
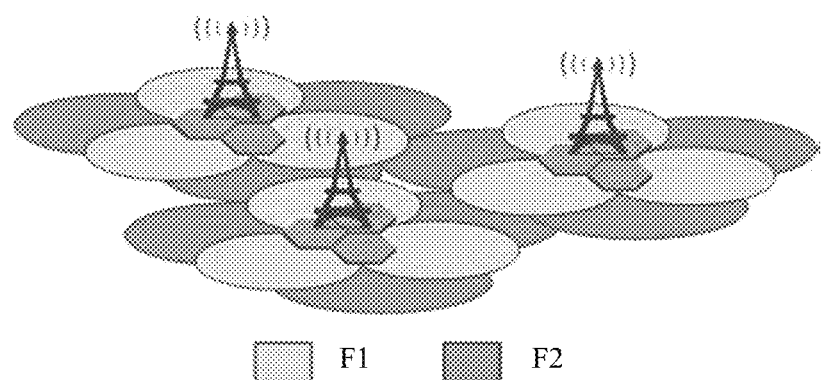

As shown in FIG. 2B and FIG. 2C, a carrier F1 and a carrier F2 share a site and have different coverage (carriers that are of a same network device and whose coverage overlaps). The carrier F1 and the carrier F2 may be located in different bands. The terminal device may simultaneously access the carrier F1 and the carrier F2 in an overlapping area between the coverage of the carrier F1 and the carrier F2. The carrier F1 and the carrier F2 are used as CCs accessed by the terminal device.

Figure 2D:
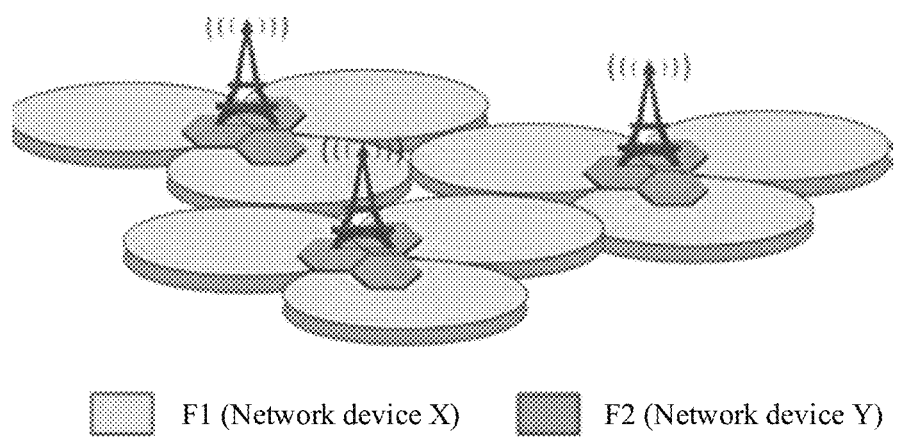

As shown in FIG. 2D, a carrier F1 and a carrier F2 do not share a site and have same coverage (carriers that are of different network devices and whose coverage is the same or approximately the same). For example, the carrier F1 and the carrier F2 may belong to a network device X and a network device Y respectively. The terminal device may simultaneously access the carrier F1 and the carrier F2 in an overlapping area between the coverage of the carrier F1 and the carrier F2, and the carrier F1 and the carrier F2 are used as CCs accessed by the terminal device, to implement dual connectivity to the network device X and the network device Y.

FIG. 2A to FIG. 2D are merely examples of a scenario in which the terminal device accesses the plurality of CCs. It should be understood that the embodiments of this application may be further applied to another scenario in which the terminal device accesses a plurality of CCs.

Before the embodiments of this application are described, some terms in this application are first described, to help a person skilled in the art have a better understanding.

(1) A terminal device includes a device that provides a user with voice and/or data connectivity, for example, may include a handheld device with a wireless connection function, or a processing device connected to a wireless modem. The terminal device may communicate with a core network through a radio access network (RAN), and exchange a voice and/or data with the RAN. The terminal device may include user equipment (UE), a wireless terminal device, a mobile terminal device, a device-to-device (D2D) terminal device, a V2X terminal device, a machine-to-machine/machine-type communication (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus. For example, the terminal device may include a device such as a personal communications service (PCS) phone, a cordless phone, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner.

As an example instead of a limitation, in the embodiments of this application, the terminal device may alternatively be a wearable device. The wearable device may also be referred to as a wearable intelligent device, an intelligent wearable device, or the like, and is a generic term for wearable devices that are developed by applying wearable technologies to intelligent designs of daily wear, such as glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

If the various terminal devices described above are located in a vehicle (for example, placed in the vehicle or mounted in the vehicle), the terminal devices may be considered as vehicle-mounted terminal devices. For example, the vehicle-mounted terminal devices are also referred to as on-board units (OBU).

In the embodiments of this application, the terminal device may further include a relay (relay). Alternatively, it may be understood that any device that can perform data communication with a base station may be considered as the terminal device.

(2) A network device may be a device that is in an access network and that communicates with a wireless terminal device over an air interface through one or more cells. The network device may be a node in a radio access network, and may also be referred to as a base station and a radio access network (RAN) node (or device). Currently, for example, some network devices are a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), and a wireless fidelity (Wi-Fi) access point (AP). In addition, in a network structure, the network device may include a centralized unit (CU) node and a distributed unit (DU) node. The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer.

Figure 3:
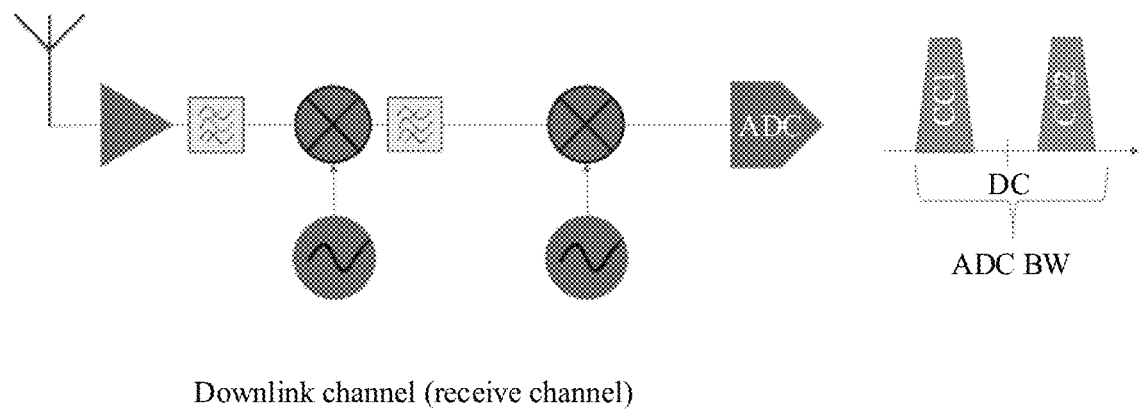
FIG. 3 is a schematic diagram showing that a downlink channel supports a plurality of component carriers according to an embodiment of this application.

(3) A downlink channel (receive channel) of one transceiver channel (for example, an RF transceiver channel) used to receive and send a plurality of CCs in carrier aggregation in an FR2 band (intra-band CA) is used as an example of an architecture in which a plurality of CCs are received and sent by using one transceiver channel. As shown in FIG. 3, bandwidth (BW) processed by an analog-to-digital converter (ADC) of the downlink channel (receive channel) of the transceiver channel includes total bandwidth of downlink CCs and a gap between the downlink CCs, for example, total bandwidth of a CC 1, a CC 2, and a gap between the CC 1 and the CC 2.

Figure 4:
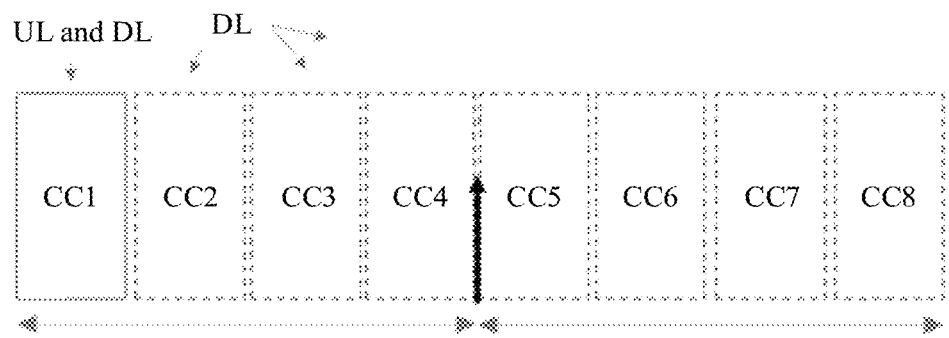
FIG. 4 is a schematic diagram showing that an uplink channel and a downlink channel share one LO according to an embodiment of this application.

In addition, because an uplink channel and a downlink channel of a transceiver channel share one PLL, that is, an uplink CC and a downlink CC correspond to a same LO location at the same time. As shown in FIG. 4, when a plurality of CCs (including an uplink CC and a downlink CC) share one transceiver channel, the transceiver channel supports a total of eight CCs, where a CC 1 is an uplink (uplink, UL) CC, and the CC 1 to a CC 8 are downlink (downlink, DL) CCs.

(4) In an existing mechanism of reporting capability information of a terminal device, an existing terminal device separately reports an uplink frequency separation class and a downlink frequency separation class.

For frequency separation classes of non-contiguous carrier aggregation (non-contiguous CA), refer to Table 5.3A.4-2 (Table 5.3A.4-2). It is defined in the TS 38.101-2 protocol that a frequency separation class indicates a maximum frequency separation between a lower edge of a lowest CC and an upper edge of a highest CC that are respectively supported by a terminal device in downlink or uplink.

TABLE 5.3A.4-2

| Frequency separation class (frequency separation class) | Frequency separation (Fs) (frequency separation) |
|---|---|
| I | Fs ≤ 800 |
| II | Fs ≤ 1200 |
| III | Fs ≤ 1400 |

For example, as shown in Table 5.3A.4-2, the maximum frequency separation between the lower edge of the lowest CC and the upper edge of the highest CC that can be respectively supported by the terminal device is divided into three levels, namely, I, II, and III, which are respectively 800 MHz, 1200 MHz, and 1400 MHz. For the non-contiguous CA, after the terminal device separately reports the uplink frequency separation class and the downlink frequency separation class, a network device configures (allocates) non-contiguous CA in the uplink frequency separation class and the downlink frequency separation class for the terminal device.

For contiguous carrier aggregation (contiguous CA), an aggregated bandwidth class (bandwidth class) defines bandwidth that can be supported under a corresponding quantity of CCs in the contiguous CA, and is reported as a capability of the terminal device per band combination (per band combination). For example, a definition in the existing protocol TS 38.101 is shown in the following table.

TABLE 5.3A.4-1

| NR CA bandwidth class | Aggregated channel bandwidth (aggregated channel bandwidth) | Number of contiguous CCs (quantity of contiguous CCs) | Fallback group (fallback group) |
|---|---|---|---|
| A | $BW_{Channel} \leq 400$ MHz | 1 | 1, 2, 3, 4 |
| B | 400 MHz $< BW_{Channel\_CA} \leq 800$ MHz | 2 | 1 |
| C | 800 MHz $< BW_{Channel\_CA} \leq 1200$ MHz | 3 | |
| D | 200 MHz $< BW_{Channel\_CA} \leq 400$ MHz | 2 | 2 |
| E | 400 MHz $< BW_{Channel\_CA} \leq 600$ MHz | 3 | |
| F | 600 MHz $< BW_{Channel\_CA} \leq 800$ MHz | 4 | |
| G | 100 MHz $< BW_{Channel\_CA} \leq 200$ MHz | 2 | 3 |
| H | 200 MHz $< BW_{Channel\_CA} \leq 300$ MHz | 3 | |
| I | 300 MHz $< BW_{Channel\_CA} \leq 400$ MHz | 4 | |
| J | 400 MHz $< BW_{Channel\_CA} \leq 500$ MHz | 5 | |
| K | 500 MHz $< BW_{Channel\_CA} \leq 600$ MHz | 6 | |
| L | 600 MHz $< BW_{Channel\_CA} \leq 700$ MHz | 7 | |
| M | 700 MHz $< BW_{Channel\_CA} \leq 800$ MHz | 8 | |
| O | 100 MHz $\leq BW_{Channel\_CA} \leq 200$ MHz | 2 | 4 |
| P | 150 MHz $\leq BW_{Channel\_CA} \leq 300$ MHz | 3 | |
| Q | 200 MHz $\leq BW_{Channel\_CA} \leq 400$ MHz | 4 | |

As shown in Table 5.3A.4-1, for the contiguous CA, using a bandwidth class B in the table as an example, two contiguous CCs can support up to 800 MHz. Currently, in the TS 38.101 protocol, an uplink bandwidth class and a downlink bandwidth class are also separately reported.

Figure 5A:
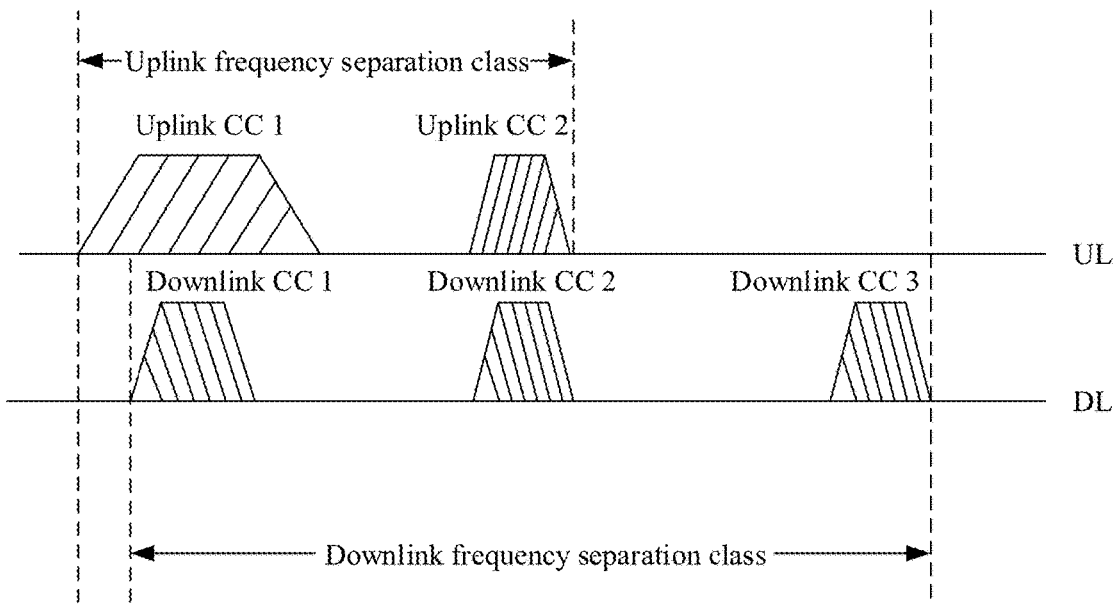
FIG. 5A and FIG. 5B each are a schematic diagram of component carrier distribution according to an embodiment of this application.

However, bandwidth and center frequencies of an uplink CC and a downlink CC are separately configured by the network device for the terminal device, and are not associated with each other. Therefore, the bandwidth and the center frequencies of the uplink CC and the downlink CC may be differently configured. The non-contiguous CA is used as an example. As shown in FIG. 5A, a terminal device separately reports an uplink frequency separation class (UL separation class) and a downlink frequency separation class (DL separation class). An uplink CC and a downlink CC that are configured by a network device for the terminal device based on the UL separation class and the DL separation class reported by the terminal device may be shown in FIG. 5A (center frequencies of the uplink CC and the downlink CC are aligned, but the bandwidth is different). In this case, an overall frequency separation including the uplink CC and the downlink CC is from a left edge of an uplink CC 1 to a right edge of a downlink CC 3, and exceeds the UL separation class and the DL separation class that are reported by the terminal device. Consequently, the terminal device cannot support the uplink CC and the downlink CC that are configured by the network device for the terminal device.

Figure 5B:
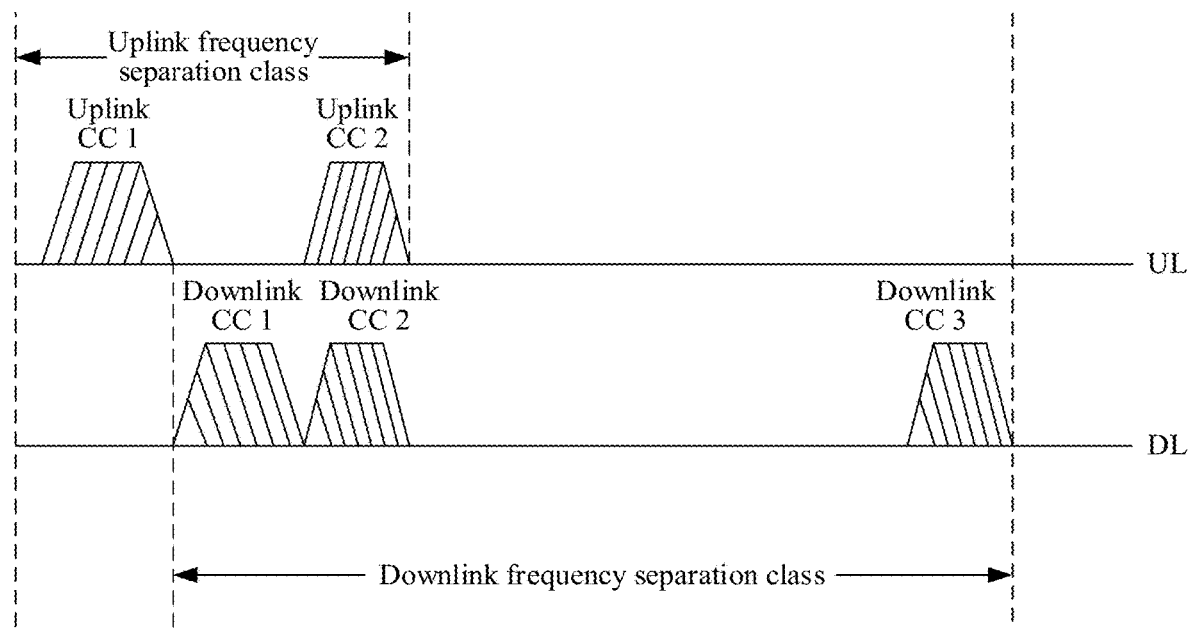

As shown in FIG. 5B (center frequencies of an uplink CC and a downlink CC are not aligned, but bandwidth is the same), a case in which the terminal device cannot support the uplink CC and the downlink CC that are configured by the network device for the terminal may also occur.

Figure 6:
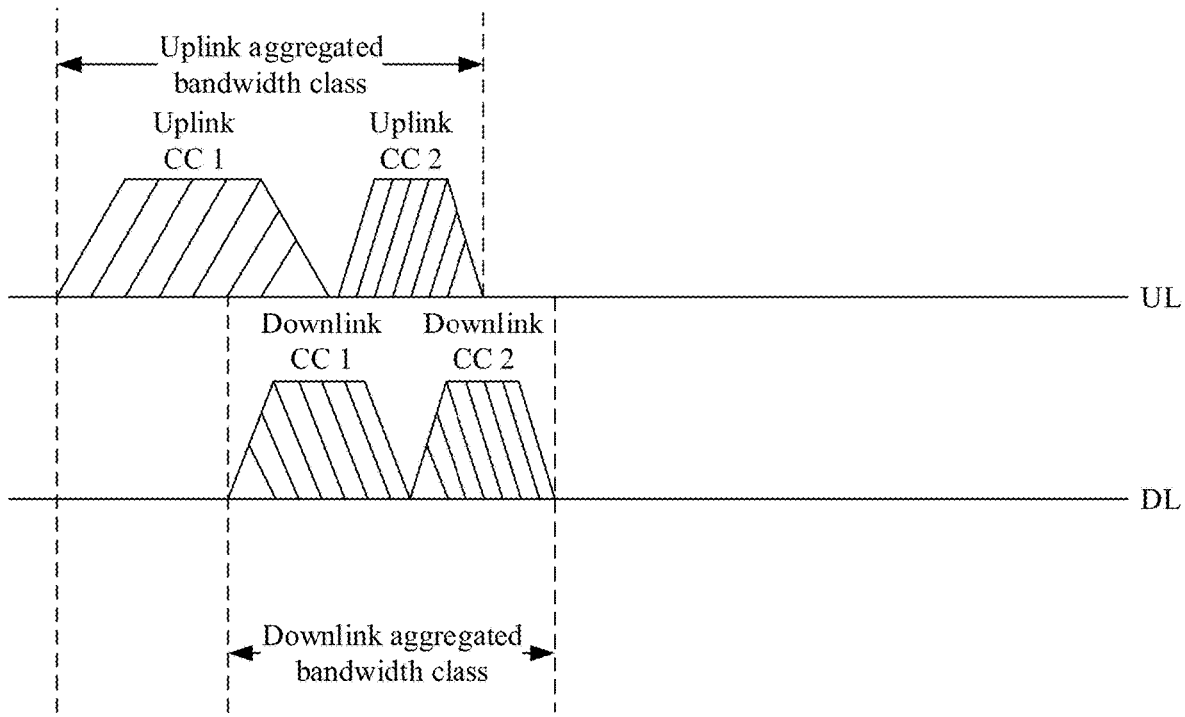
FIG. 6 is another schematic diagram of component carrier distribution according to an embodiment of this application.

The contiguous CA is used as an example. As shown in FIG. 6, a terminal device separately reports an uplink aggregated bandwidth class (UL bandwidth class) and a downlink aggregated bandwidth class (DL bandwidth class). For an uplink CC and a downlink CC configured by a network device for the terminal device based on the UL bandwidth class and the DL bandwidth class that are reported by the terminal device, an overall frequency separation that is configured for the terminal device and that includes the uplink CC and the downlink CC may also exceed the UL bandwidth class and the DL bandwidth class that are reported by the terminal device, and consequently, the terminal device cannot support the uplink CC and the downlink CC that are configured by the network device for the terminal.

This application is intended to resolve a problem that, because capability information reported by a terminal device is incomplete, the terminal device cannot support an uplink component carrier and a downlink component carrier configured by a network device for the terminal device based on the capability information reported by the terminal device, and consequently a capability reported by the terminal device does not match a configuration delivered by the network device.

The following describes in detail the embodiments of this application with reference to the accompanying drawings. In addition, it should be understood that the term "example" in the embodiments of this application is used to represent giving an example, an illustration, or a description. Any embodiment described as an "example" in this application should not be explained as being more preferred or having more advantages than another embodiment. The term "example" is used to present a concept in a particular manner.

The terms "include/comprise" and "have" in the embodiments, claims, and accompanying drawings of this application are not exclusive. For example, a process, a method, a system, a product, or a device including a series of operations or modules is not limited to the listed operations or modules, and may further include operations or modules that are not listed. The terms "system" and "network" may be used interchangeably in this specification. The term "and/or" in this specification describes only an association relationship between associated objects and represents that three relationships may exist. For example, A and/or B may represent the following three cases: only A exists, both A and B exist, and only B exists. In addition, the character "/" in this specification usually indicates an "or" relationship between the associated objects. It should be understood that, in the embodiments of this application, "B corresponding to A" indicates that B is associated with A, and B may be determined based on A. However, it should be further understood that determining B based on A does not mean that B is determined based on A only. B may alternatively be determined based on A and/or other information. In addition, unless otherwise stated, ordinal numbers such as "first" and "second" in the embodiments of this application are used to distinguish between a plurality of objects, and are not intended to limit a sequence, a time sequence, priorities, or importance of the plurality of objects. In addition, the terms "include/comprise" and "have" in the embodiments, claims, and accompanying drawings of this application are not exclusive. For example, a process, a method, a system, a product, or a device including a series of operations or modules is not limited to the listed operations or modules, and may further include operations or modules that are not listed. "A plurality of" in this application means two or more.

In addition, in the embodiments of this application, information, a signal, a message, and a channel may be interchangeably used sometimes. It should be noted that meanings expressed by the terms are consistent when differences between the terms are not emphasized. "Of", "corresponding, relevant", and "corresponding" may be interchangeably used sometimes. It should be noted that meanings expressed by the terms are consistent when differences between the terms are not emphasized.

Embodiment 1

Figure 7:
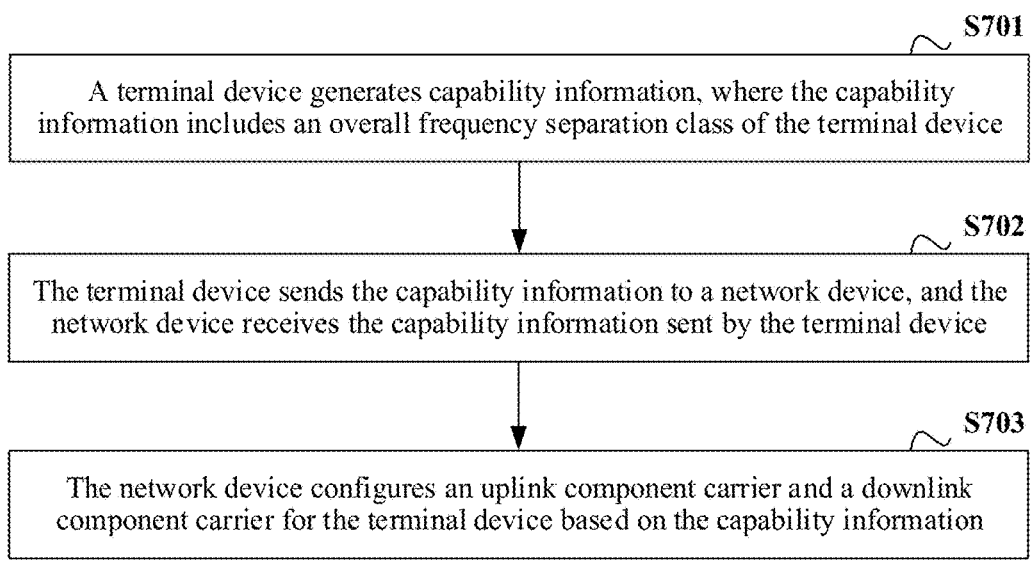
FIG. 7 is a schematic diagram of a communication process according to an embodiment of this application.

FIG. 7 is a schematic diagram of a communication process according to an embodiment of this application. The process includes the following operations.

S701: A terminal device generates capability information, where the capability information includes an overall frequency separation class of the terminal device.

The overall frequency separation class of the terminal device indicates a maximum overall frequency separation supported by the terminal device, where the maximum overall frequency separation is a maximum frequency separation between a lowest component carrier and a highest component carrier included in an uplink component carrier and a downlink component carrier supported by the terminal device.

In addition, it should be understood that, in this embodiment of this application, an uplink frequency separation class of the terminal device indicates a maximum uplink frequency separation supported by the terminal device, and a downlink frequency separation class of the terminal device indicates a maximum downlink frequency separation supported by the terminal device. The maximum uplink frequency separation supported by the terminal device is a maximum frequency separation between a lowest component carrier and a highest component carrier of the uplink component carrier supported by the terminal device. The maximum downlink frequency separation supported by the terminal device is a maximum frequency separation between a lowest component carrier and a highest component carrier of the downlink component carrier supported by the terminal device. In a scenario in which there is no gap between the uplink component carriers and between the downlink component carriers, for example, contiguous CA, the uplink frequency separation class may also be referred to as an uplink aggregated bandwidth class, and the downlink frequency separation class may also be referred to as a downlink aggregated bandwidth class.

Figure 8A:
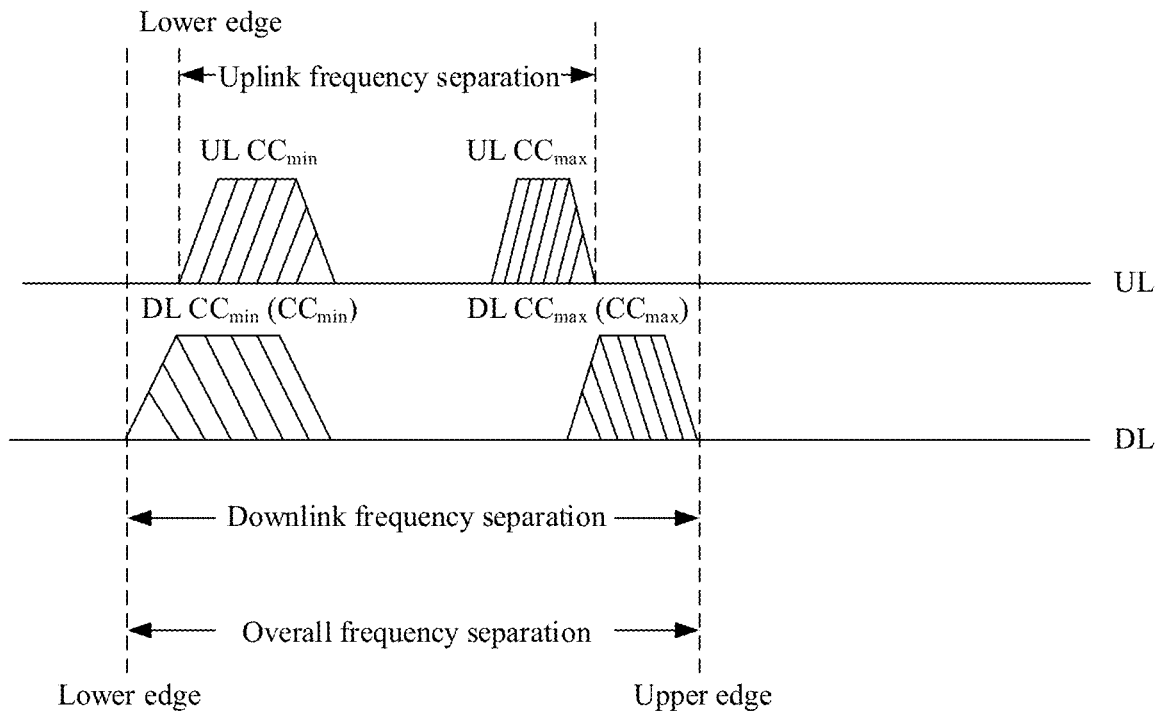
FIG. 8A and FIG. 8B each are a schematic diagram of a frequency separation of a component carrier according to an embodiment of this application.

Distribution of an uplink component carrier (UL CC) and a downlink component carrier (DL CC) shown in FIG. 8A is used as an example (there are gaps between the uplink component carriers and between the downlink component carriers). UL $CC_{min}$ indicates a lowest uplink component carrier of the foregoing component carriers, and UL $CC_{max}$ indicates a highest uplink component carrier of the foregoing component carriers. DL $CC_{min}$ indicates a lowest downlink component carrier of the foregoing component carriers, and DL $CC_{max}$ indicates a highest downlink component carrier of the foregoing component carriers. A lowest component carrier ($CC_{min}$) and a highest component carrier ($CC_{max}$) of the foregoing component carriers are DL $CC_{min}$ and DL $CC_{max}$ respectively. In this case, a maximum uplink frequency separation is a maximum value of an uplink frequency separation between UL $CC_{min}$ and UL $CC_{max}$, a maximum downlink frequency separation is a maximum value of a downlink frequency separation between DL $CC_{min}$ and DL $CC_{max}$, and a maximum overall frequency separation is a maximum value of an overall frequency separation between $CC_{min}$ and $CC_{max}$. That is, in this embodiment of this application, when the network device configures the UL CC and the DL CC for the terminal device, the maximum frequency separation between $CC_{min}$ and $CC_{max}$ in the UL CC and the DL CC can be limited by the overall frequency separation class reported by the terminal device.

Figure 8B:
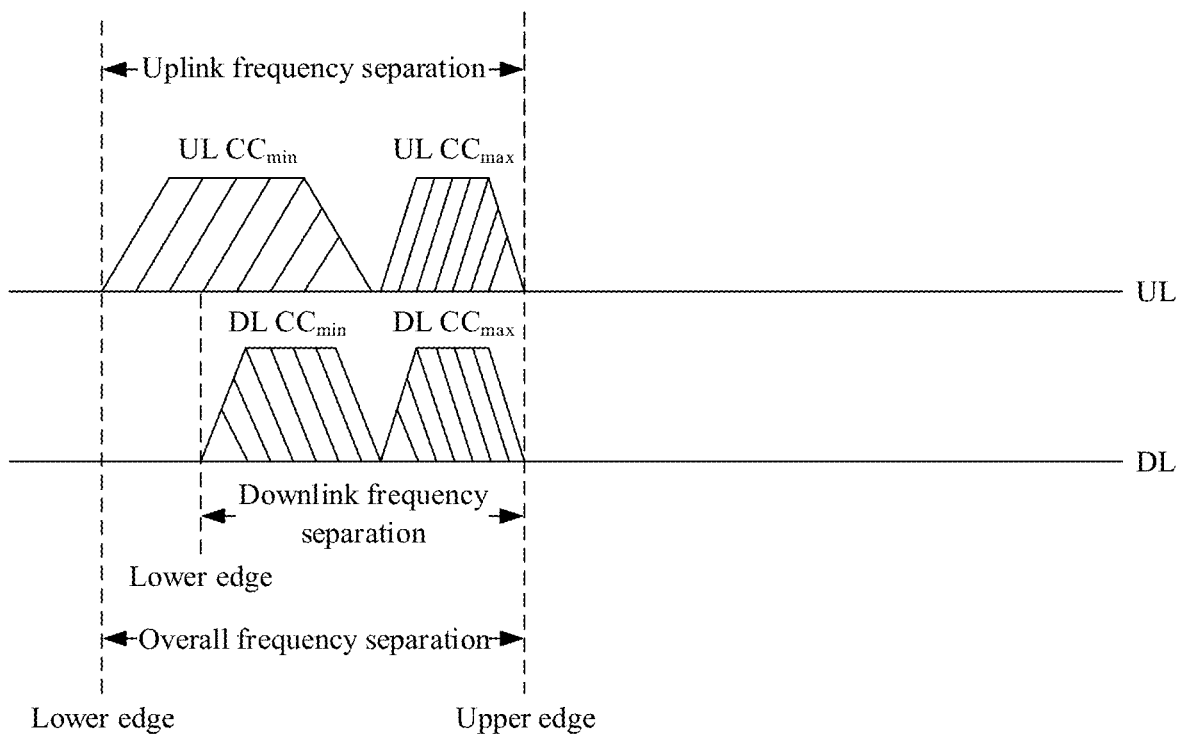

For distribution of an uplink component carrier (UL CC) and a downlink component carrier (DL CC) shown in FIG. 8B (there is no gap between the uplink component carriers and between the downlink component carriers), a maximum uplink frequency separation is also a maximum value of an uplink frequency separation between UL $CC_{min}$ and UL $CC_{max}$, a maximum downlink frequency separation is also a maximum value of a downlink frequency separation between DL $CC_{min}$ and DL $CC_{max}$, and a maximum overall frequency separation is also a maximum value of an overall frequency separation between $CC_{min}$ (UL $CC_{min}$) and $CC_{max}$ (UL $CC_{max}$ or DL $CC_{max}$). When the network device configures the UL CC and the DL CC for the terminal device, the maximum frequency separation between $CC_{min}$ and $CC_{max}$ in the UL CC and the DL CC can also be limited by the overall frequency separation class reported by the terminal device.

In this embodiment of this application, a frequency separation between any two component carriers refers to a frequency separation between a lower edge of a lowest component carrier and an upper edge of a highest component carrier in the any two component carriers. $CC_{min}$ and $CC_{max}$ in FIG. 8A are used as an example. A frequency separation between $CC_{min}$ and $CC_{max}$ is a frequency separation between a lower edge of $CC_{min}$ and an upper edge of $CC_{max}$, in other words, the maximum frequency separation between $CC_{min}$ and $CC_{max}$ refers to a maximum frequency separation between the lower edge of $CC_{min}$ and the upper edge of $CC_{max}$.

It should be understood that, in this embodiment of this application, "lowest" in the lowest component carrier means a lowest frequency (the lower edge) in the component carrier, and "highest" in the highest component carrier means a highest frequency (the upper edge) in the component carrier.

In one embodiment, the overall frequency separation may alternatively be a maximum frequency separation between a first component carrier and a second component carrier supported by the terminal device, where the first component carrier is the lowest component carrier included in the uplink component carrier and the downlink component carrier supported by the terminal device, and the second component carrier is the highest component carrier included in the uplink component carrier and the downlink component carrier supported by the terminal device. Refer to the distribution of the component carriers shown in FIG. 8A. DL $CC_{min}$ is the first component carrier, and DL $CC_{max}$ is the second component carrier.

In this embodiment of this application, the maximum overall frequency separation indicated by the overall frequency separation class of the terminal device limits the overall frequency separation including the uplink component carrier and the downlink component carrier supported by the terminal device, to avoid that, because the network device configures the uplink component carrier and the downlink component carrier for the terminal device based only on the maximum uplink frequency separation and the maximum downlink frequency separation supported by the terminal device (in other words, based only on the uplink frequency separation class and the downlink frequency separation class supported by the terminal device), the overall frequency separation of the uplink component carrier and the downlink component carrier configured for the terminal device exceeds the maximum uplink frequency separation and the maximum downlink frequency separation supported by the terminal device and consequently a transceiver channel that is of the terminal device and that shares one LO cannot provide support.

Based on this, in one embodiment, the maximum overall frequency separation supported by the terminal device is equal to a maximum value of the maximum uplink frequency separation and the maximum downlink frequency separation supported by the terminal device. In other words, the overall frequency separation class of terminal device is the same as a maximum frequency separation class of the uplink frequency separation class and the downlink frequency separation class of the terminal device, and is usually the same as the downlink frequency separation class. A maximum frequency separation class means that a maximum frequency separation range indicated by the frequency separation class is maximum. For example, if the maximum uplink frequency separation indicated by the uplink frequency separation class is 600 MHz, and the maximum downlink frequency separation indicated by the downlink frequency separation class is 800 MHz, the downlink frequency separation class is greater than the uplink frequency separation class, and the overall frequency separation class of the terminal device is the same as the downlink frequency separation class.

In addition, in one embodiment, the capability information generated by the terminal device further includes the uplink frequency separation class and the downlink frequency separation class of the terminal device, to help the network device learn of the maximum uplink frequency separation and the maximum downlink frequency separation supported by the terminal device.

In one embodiment, when the overall frequency separation class of the terminal device is the same as the maximum frequency separation class of the uplink frequency separation class and the downlink frequency separation class of the terminal device, the capability information generated by the terminal device further includes terminal device type indication information used to indicate whether the uplink frequency separation class and the downlink frequency separation class of the terminal device is the same. The generated capability information includes the uplink frequency separation class and the downlink frequency separation class of the terminal device only when the uplink frequency separation class and the downlink frequency separation class of the terminal device are different, to reduce signaling overheads.

The terminal device type indication information may include a first terminal device type identifier (for example, a UE type 1) or a second terminal device type identifier (for example, a UE type 2), where the first terminal device type identifier indicates that the uplink frequency separation class and the downlink frequency separation class of the terminal device are the same, and the second terminal device type identifier indicates that the uplink frequency separation class and the downlink frequency separation class of the terminal device are different.

In one embodiment, if the maximum uplink frequency separation and the maximum downlink frequency separation supported by a BB, RF, a used LO, and the like of the transceiver channel of the terminal device are the same, it indicates that the uplink frequency separation class and the downlink frequency separation class of the terminal device are the same as the overall frequency separation class, so that the network device may precisely learn of the uplink frequency separation class and the downlink frequency separation class of the terminal device by using the overall frequency separation class of the terminal device. The capability information generated by the terminal device may include only the overall frequency separation class of the terminal device and the first terminal device type identifier used to indicate that the uplink frequency separation class and the downlink frequency separation class of the terminal device are the same, to reduce the signaling overheads.

In an example, if the maximum uplink frequency separation supported by the terminal device is 600 MHz, the maximum downlink frequency separation supported by the terminal device is 800 MHz, and the overall frequency separation supported by the terminal device is 800 MHz, the uplink frequency separation class used by the terminal device to indicate the maximum uplink frequency separation supported by the terminal device and the downlink frequency separation class used by the terminal device to indicate the maximum downlink frequency separation supported by the terminal device are different, and the uplink frequency separation class and the downlink frequency separation class of the terminal device cannot be learned of based on the overall frequency separation of the terminal device. Therefore, when the terminal device generates the capability information, the capability information includes the overall frequency separation class of the terminal device, the second terminal device type identifier used to indicate that the uplink frequency separation class and the downlink frequency separation class of the terminal device are different, the uplink frequency separation class of the terminal device, and the downlink frequency separation class of the terminal device.

If the maximum uplink frequency separation supported by the terminal device is 800 MHz, the maximum downlink frequency separation supported by the terminal device is 800 MHz, and the overall frequency separation class supported by the terminal device is 800 MHz, the uplink frequency separation class used by the terminal device to indicate the maximum uplink frequency separation supported by the terminal device and the downlink frequency separation class used by the terminal device to indicate the maximum downlink frequency separation supported by the terminal device are the same, and the uplink frequency separation class and the downlink frequency separation class of the terminal device can be learned of based on the overall frequency separation of the terminal device. Therefore, when the terminal device generates the capability information, the capability information includes only the overall frequency separation class of the terminal device and the first terminal device type identifier used to indicate that the uplink frequency separation class and the downlink frequency separation class of the terminal device are the same.

S702: The terminal device sends the capability information to the network device, and the network device receives the capability information from the terminal device.

In one embodiment, the capability information may be sent to the network device by using a radio resource control (RRC) message.

S703: The network device configures the uplink component carrier and the downlink component carrier for the terminal device based on the capability information.

After receiving the capability information from the terminal device, the network device determines the maximum uplink frequency separation, the maximum downlink frequency separation, and the maximum overall frequency separation supported by the terminal device based on the uplink frequency separation class, downlink frequency separation class, and the overall frequency separation class of the terminal device; and configures the uplink component carrier and the downlink component carrier for the terminal device within the maximum uplink frequency separation, the maximum downlink frequency separation, and the maximum overall frequency separation supported by the terminal device.

Figure 9A:
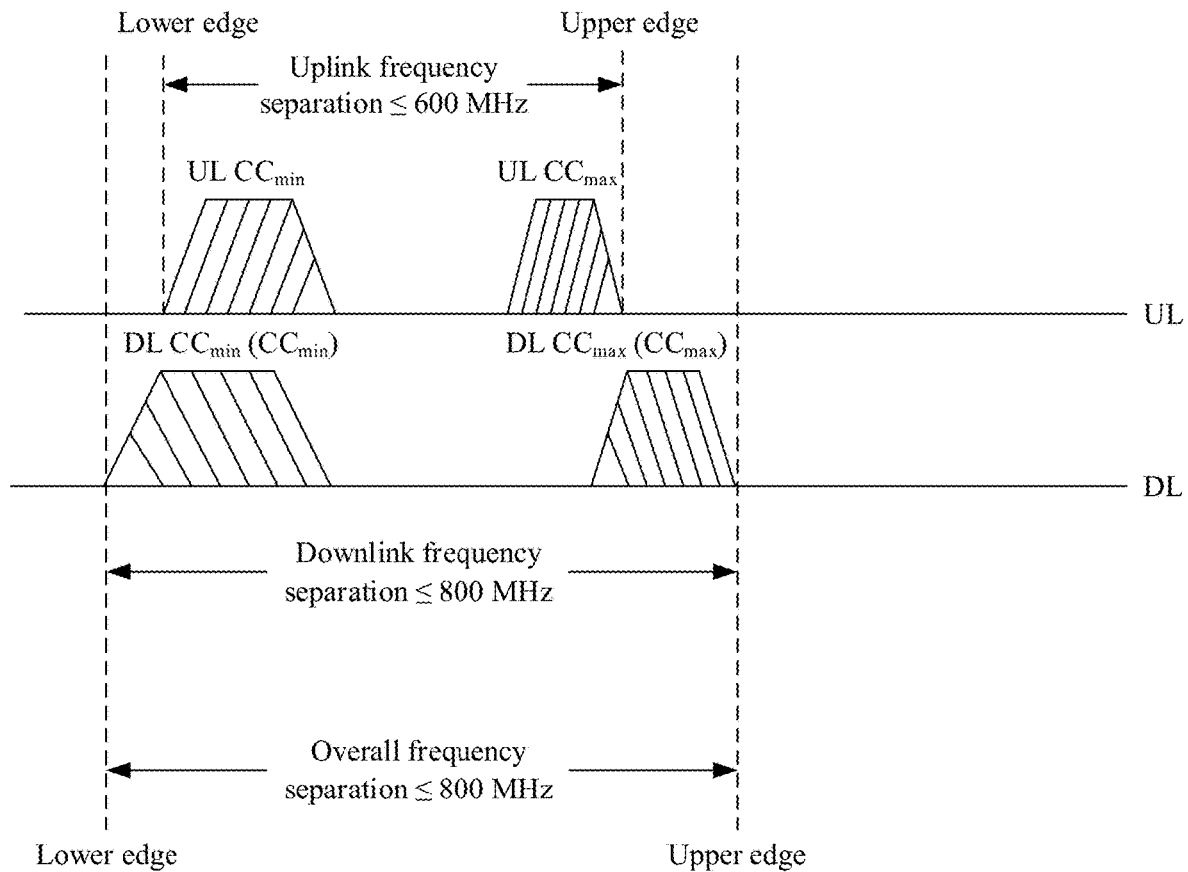
FIG. 9A to FIG. 9C each are a schematic diagram of configured component carrier distribution according to an embodiment of this application.
Figure 9B:
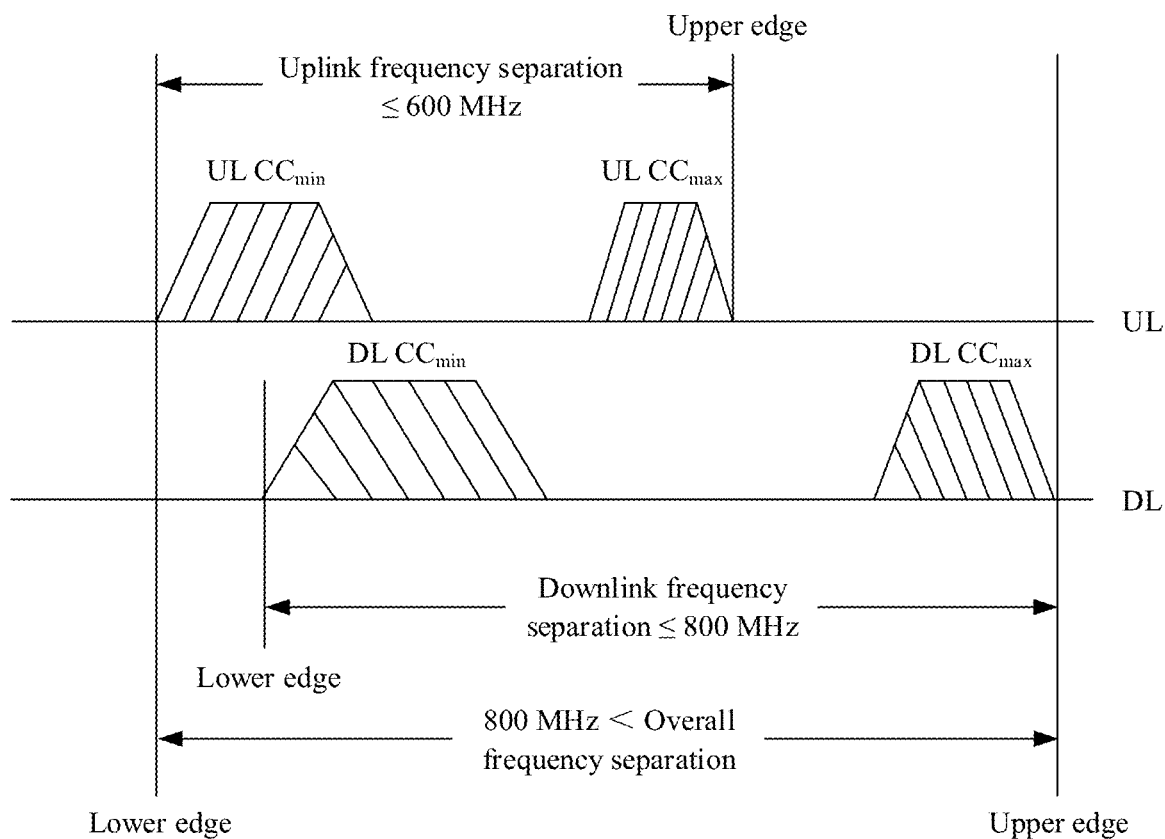
Figure 9C:
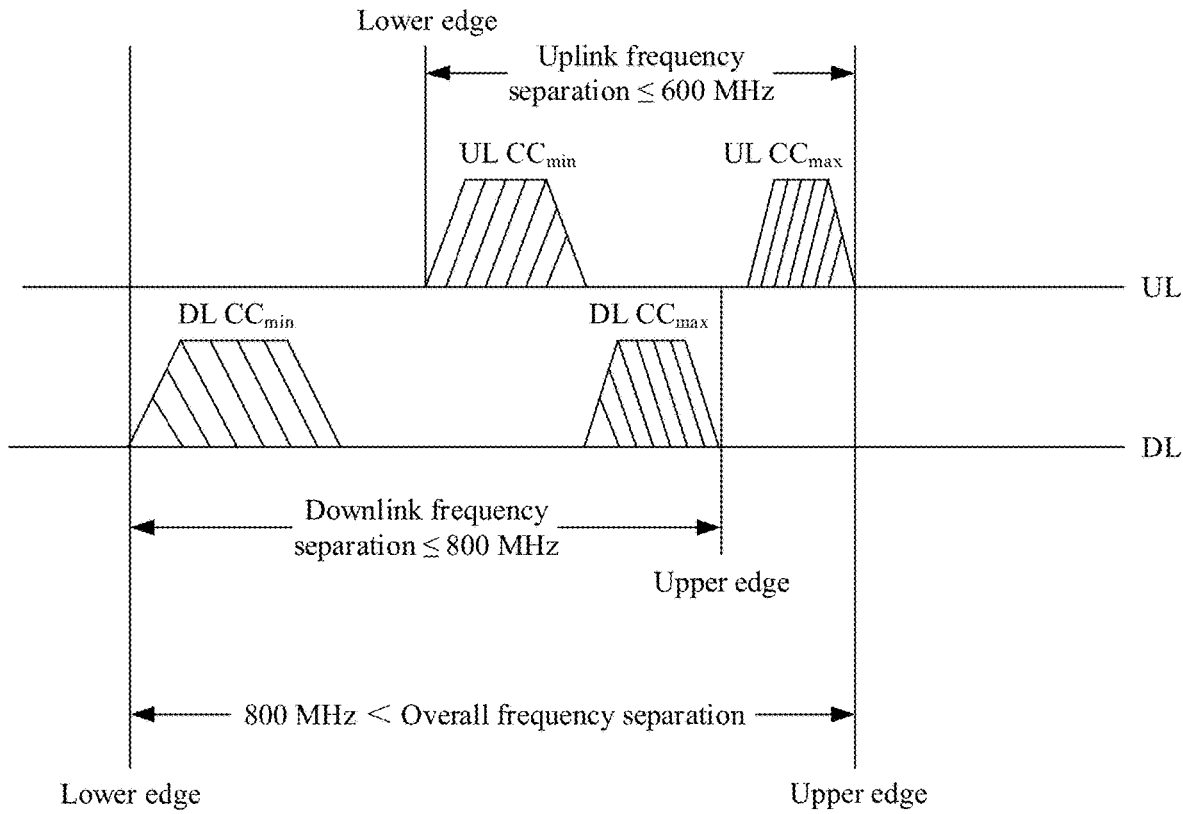

For example, it is determined, based on the capability information from the terminal device, that the maximum uplink frequency separation supported by the terminal device is 600 MHz, the maximum downlink frequency separation supported by the terminal device is 800 MHz, and the maximum overall frequency separation supported by the terminal device is 800 MHz. The uplink component carrier and the downlink component carrier that are configured by the network device for the terminal device may be shown in FIG. 9A. An uplink frequency separation of the uplink component carrier is less than or equal to 600 MHz, a downlink frequency separation of the downlink component carrier is less than or equal to 800 MHz, and an overall frequency separation including the uplink component carrier and the downlink component carrier is less than or equal to 800 MHz. By including the overall frequency separation class of the terminal device in the capability information, it is avoided that, as shown in FIG. 9B and FIG. 9C, because the frequency separation of the uplink component carrier is less than or equal to 600 MHz, the frequency separation of the downlink component carrier is less than or equal to 800 MHz, but the overall frequency separation including the uplink component carrier and the downlink component carrier is greater than 800 MHz, the terminal device cannot support the uplink component carrier and the downlink component carrier configured by the network device for the terminal device and consequently the capability reported by the terminal does not match the configuration delivered by the network.

In one embodiment, the uplink component carrier and the downlink component carrier supported by the terminal device may be located in a band combination including one or more bands. In one embodiment, the uplink component carrier and the downlink component carrier configured by the network device for the terminal device may be located in one band, or may be located in a plurality of bands. This is applicable to scenarios such as intra-band contiguous CA/DC, intra-band non-contiguous CA/DC, and inter-band CA/DC.

It should be understood that the foregoing capability information is generated for the terminal device supporting only one transceiver channel. In one embodiment, when a carrier spectrum separation of the network device is large, for example, a spectrum separation increases in the scenarios such as the intra-band CA/DC and/or inter-band CA/DC, and the terminal device cannot provide support by using one transceiver channel, the terminal device may alternatively provide support by using a plurality of transceiver channels. The terminal device generates, for one or more transceiver channels of the terminal device, one or more pieces of capability information corresponding one-to-one to the one or more transceiver channels, and sends the one or more pieces of capability information to the network device. The network device configures an uplink component carrier and a downlink component carrier for the one or more transceiver channels of the terminal device on a one-to-one basis based on the one or more pieces of capability information that are reported by the terminal device and that correspond one-to-one to the one or more transceiver channels, to improve a capability of communication between the network device and the terminal device.

For example, the terminal device may send/report the capability information of the plurality of transceiver channels by using an array. Using a transceiver channel 1 and a transceiver channel 2 as an example, the terminal device may send an RRC message including a separation class 1 and a separation class 2 to the network device, to report capability information of the transceiver channel 1 and the transceiver channel 2 of the terminal device, where the separation class 1 indicates the capability information of the transceiver channel 1 of the terminal device, and the separation class 2 indicates the capability information of the transceiver channel 2 of the terminal device. The network device configures an uplink component carrier and a downlink component carrier for the transceiver channel 1 of the terminal device based on the separation class 1, and configures an uplink component carrier and a downlink component carrier for the transceiver channel 2 of the terminal device based on the separation class 2.

In addition, in the scenarios such as the inter-band CA/DC, the terminal device may report an uplink frequency separation and a downlink frequency separation of the terminal device in the band combination per band combination, to enrich a manner of reporting capability information and reduce the signaling overheads. The following provides descriptions in detail with reference to the embodiments.

Embodiment 2

Figure 10:
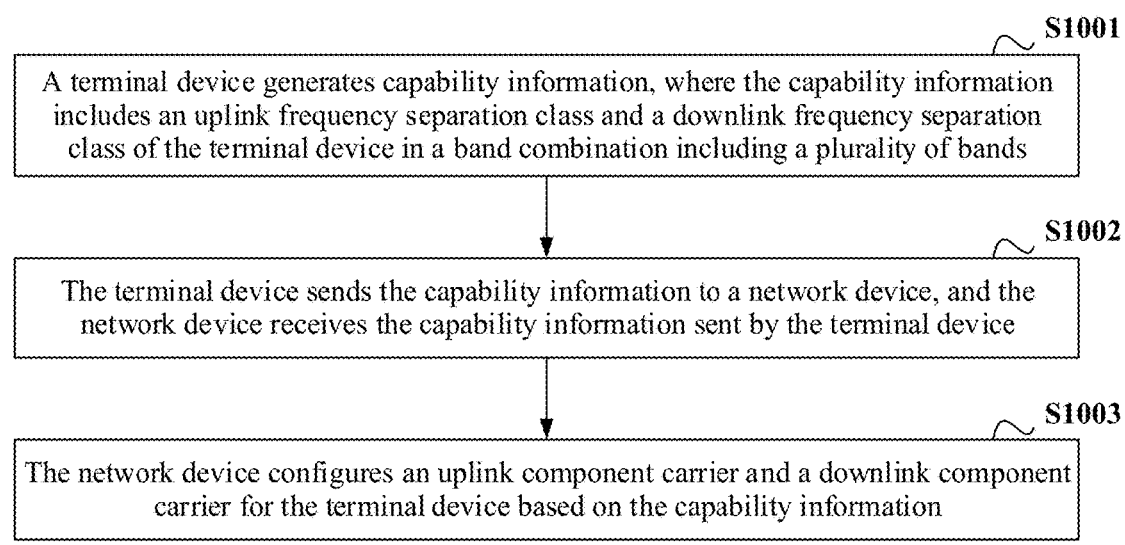
FIG. 10 is another schematic diagram of a communication process according to an embodiment of this application.

FIG. 10 is a schematic diagram of a communication process according to an embodiment of this application. The process includes the following operations.

S1001: A terminal device generates capability information, where the capability information includes an uplink frequency separation class and a downlink frequency separation class of the terminal device in a band combination including a plurality of bands.

In this embodiment of this application, in scenarios such as an inter-band CA/DC in which a plurality of bands exist, if frequencies of the plurality of bands are contiguous, the terminal device may report the capability information to a network device per band combination. That is, the terminal device reports one uplink frequency separation class and one downlink frequency separation class as a whole for the band combination including the plurality of bands.

For example, the band combination includes a band 1, a band 2, and a band 3. The terminal device generates capability information including an uplink frequency separation class in (the band 1, the band 2, and the band 3) and downlink frequency separation class in (the band 1, the band 2, and the band 3).

S1002: The terminal device sends the capability information to the network device, and the network device receives the capability information from the terminal device.

In one embodiment, the capability information may be sent to the network device by using an RRC message.

S1003: The network device configures an uplink component carrier and a downlink component carrier for the terminal device based on the capability information.

After the network device receives the capability information from the terminal device, the network device configures the uplink component carrier and the downlink component carrier for the plurality of bands in the band combination based on an uplink frequency separation and a downlink frequency separation of the terminal device in the band combination.

For example, the capability information from the terminal device includes the uplink frequency separation class in the band combination (the band 1, the band 2, and the band 3), which is "II", and the downlink frequency separation class in the band combination (the band 1, the band 2, and the band 3), which is "II". The network device configures an uplink component carrier for the terminal device in the band 1, the band 2, and the band 3 within the uplink frequency separation class "II", and configures a downlink component carrier for the terminal device in the band 1, the band 2, and the band 3 within the downlink frequency separation class "II".

It should be understood that the foregoing capability information is generated for the terminal device supporting only one transceiver channel. In one embodiment, when a carrier spectrum separation of the network device is large, for example, a spectrum separation increases in the scenarios such as the inter-band CA/DC, and the terminal device cannot provide support by using one transceiver channel, the terminal device may alternatively provide support by using a plurality of transceiver channels. The terminal device generates, for one or more transceiver channels of the terminal device, one or more pieces of capability information corresponding one-to-one to the one or more transceiver channels, and sends the one or more pieces of capability information to the network device. The network device configures an uplink component carrier and a downlink component carrier for the one or more transceiver channels of the terminal device on a one-to-one basis based on the one or more pieces of capability information that are reported by the terminal device and that correspond one-to-one to the one or more transceiver channels, to improve a capability of communication between the network device and the terminal device.

Embodiment 3

The foregoing describes the solutions provided in this application mainly from a perspective of interaction between the network device and the terminal device. It may be understood that to implement the foregoing functions, each network element includes a corresponding hardware structure and/or software module (or unit) for implementing each function. A person skilled in the art should easily be aware that, in combination with units and algorithm operations of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use a different method to implement the described functions for each particular application, but it should not be considered that the embodiment goes beyond the scope of this application.

Figure 11:
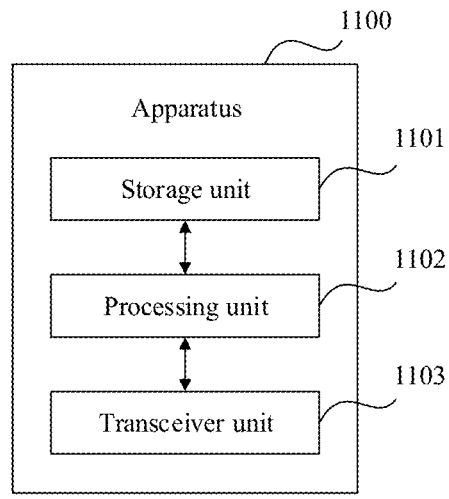
FIG. 11 is a schematic block diagram of a communication apparatus according to an embodiment of this application.

When an integrated unit (module) is used, FIG. 11 is a possible schematic block diagram of a communication apparatus according to an embodiment of this application. The apparatus 1100 may exist in a form of software. The apparatus 1100 may include a processing unit 1102 and a transceiver unit 1103.

In one embodiment, the processing unit 1102 is configured to implement a corresponding processing function. The transceiver unit 1103 is configured to support the apparatus 1100 to communicate with another network entity. In one embodiment, the transceiver unit 1103 may include a receiving unit and/or a sending unit, which are respectively configured to perform a receiving operation and a sending operation. In one embodiment, the apparatus 1100 may further include a storage unit 1101, configured to store program code and/or data of the apparatus 1100.

The apparatus 1100 may be the terminal device in any one of the foregoing embodiments, or may be a component, such as a chip, disposed in the terminal device. The processing unit 1102 may support the apparatus 1100 to execute actions of the terminal device in the foregoing method examples. Alternatively, the processing unit 1102 mainly executes internal actions of the terminal device in the method examples, and the transceiver unit 1103 may support communication between the apparatus 1100 and a network device.

In one embodiment, the processing unit 1102 is configured to generate capability information, where the capability information includes an overall frequency separation class, and the overall frequency separation class indicates a maximum frequency separation between a lowest component carrier and a highest component carrier included in an uplink component carrier and a downlink component carrier that are supported.

The transceiver unit 1103 is configured to send the capability information to the network device.

In one embodiment, the capability information further includes:
terminal device type indication information, where the terminal device type indication information includes a first terminal device type identifier or a second terminal device type identifier, where the first terminal device type identifier indicates that an uplink frequency separation class and a downlink frequency separation class are the same, and the second terminal device type identifier indicates that the uplink frequency separation class and the downlink frequency separation class are different.

In one embodiment, when the terminal device type indication information includes the second terminal device type identifier, the capability information further includes:
the uplink frequency separation class and the downlink frequency separation class.

In one embodiment, the uplink component carrier and the downlink component carrier that are supported are located in a band combination including one or more bands.

In one embodiment, the processing unit 1102 is configured to generate, for one or more transceiver channels, one or more pieces of capability information corresponding one-to-one to the one or more transceiver channels.

In another possible embodiment, the processing unit 1102 is configured to generate capability information, where the capability information includes an uplink frequency separation class and a downlink frequency separation class in a band combination including a plurality of bands.

The transceiver unit 1103 is configured to send the capability information to the network device.

In one embodiment, the processing unit 1102 is configured to generate, for one or more transceiver channels, one or more pieces of capability information corresponding one-to-one to the one or more transceiver channels.

The foregoing processing unit 1102 may be implemented by using a processor, the foregoing transceiver unit 1103 may be implemented by using a transceiver, a communication interface, or the like, and the storage unit 1101 may be implemented by using a memory.

Figure 12:
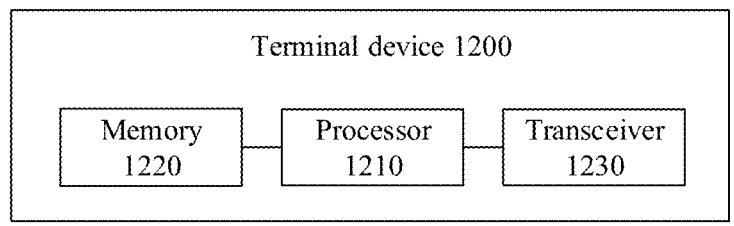
FIG. 12 is another schematic block diagram of a terminal device according to an embodiment of this application.

As shown in FIG. 12, an embodiment of this application further provides a terminal device 1200. The terminal device 1200 includes a processor 1210, a memory 1220, and a transceiver 1230.

In one embodiment, the memory 1220 stores instructions, a program, or data, and the memory 1220 may be configured to implement a function of the storage unit 1101 in the foregoing embodiment. The processor 1210 is configured to read the instructions, program, or data stored in the memory 1220. When the instructions or program stored in the memory 1220 are/is executed, the processor 1210 is configured to perform an operation performed by the processing unit 1102 in the foregoing embodiment, and the transceiver 1230 is configured to perform an operation performed by the transceiver unit 1103 in the foregoing embodiment.

It should be understood that the terminal device 1100 or the terminal device 1200 in the embodiments of this application may correspond to the terminal device in the communication method (FIG. 7 or FIG. 10) in the embodiments of this application, and operations and/or functions of the modules in the terminal device 1100 or the terminal device 1200 are separately used to implement corresponding procedures of the method in FIG. 7 or FIG. 10. For brevity, details are not described herein again.

Figure 13:
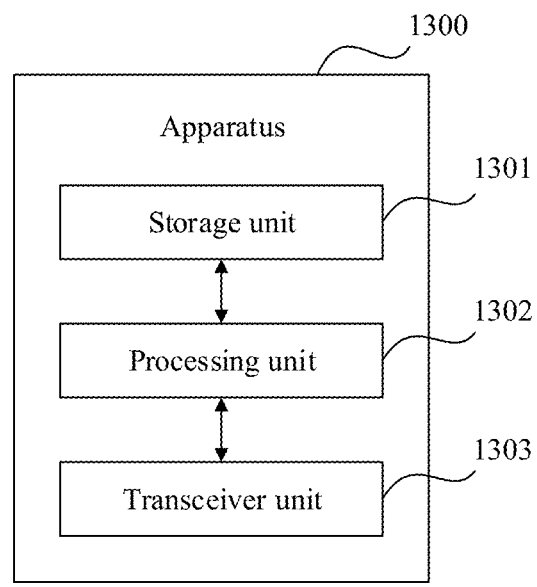
FIG. 13 is a schematic block diagram of a communication apparatus according to an embodiment of this application.

When an integrated unit (module) is used, FIG. 13 is a possible schematic block diagram of another communication apparatus according to an embodiment of this application. The communication apparatus 1300 may exist in a form of software. The apparatus 1300 may include a processing unit 1302 and a transceiver unit 1303.

In one embodiment, the processing unit 1302 is configured to implement a corresponding processing function. The transceiver unit 1303 is configured to support the apparatus 1300 to communicate with another network entity. In one embodiment, the transceiver unit 1303 may include a receiving unit and/or a sending unit, which are respectively configured to perform a receiving operation and a sending operation. In one embodiment, the apparatus 1300 may further include a storage unit 1301, configured to store program code and/or data of the apparatus 1300.

The apparatus 1300 may be the network device in any one of the foregoing embodiments (for example, the network device is the network device in Embodiment 1), or may be a component, such as a chip, disposed in the network device. The processing unit 1302 may support the apparatus 1300 to execute actions of the network device in the foregoing method examples. Alternatively, the processing unit 1302 mainly executes internal actions of the network device in the method examples, and the transceiver unit 1303 may support communication between the apparatus 1300 and a terminal device.

In one embodiment, the transceiver unit 1303 is configured to receive capability information from the terminal device, where the capability information includes an overall frequency separation class of the terminal device, and the overall frequency separation class indicates a maximum frequency separation between a lowest component carrier and a highest component carrier included in an uplink component carrier and a downlink component carrier supported by the terminal device.

The processing unit 1302 is configured to configure the uplink component carrier and the downlink component carrier for the terminal device based on the capability information.

In one embodiment, the capability information further includes:
terminal device type indication information, where the terminal device type indication information includes a first terminal device type identifier or a second terminal device type identifier, where the first terminal device type identifier indicates that an uplink frequency separation class and a downlink frequency separation class of the terminal device are the same, and the second terminal device type identifier indicates that the uplink frequency separation class and the downlink frequency separation class of the terminal device are different.

In one embodiment, when the terminal device type indication information includes the second terminal device type identifier, the capability information further includes:
the uplink frequency separation class and the downlink frequency separation class of the terminal device.

In one embodiment, the uplink component carrier and the downlink component carrier supported by the terminal device are located in a band combination including one or more bands.

In one embodiment, the transceiver unit 1303 is configured to receive one or more pieces of capability information corresponding one-to-one to one or more transceiver channels of the terminal device.

The processing unit 1302 is configured to configure the uplink component carrier and the downlink component carrier for the one or more transceiver channels of the terminal device based on the one or more pieces of capability information corresponding one-to-one to the one or more transceiver channels of the terminal device.

In one embodiment, the transceiver unit 1303 is configured to receive capability information from the terminal device, where the capability information includes an uplink frequency separation class and a downlink frequency separation class of the terminal device in a band combination including a plurality of bands.

The processing unit 1302 is configured to configure an uplink component carrier and a downlink component carrier for the terminal device based on the capability information.

In one embodiment, the transceiver unit 1303 is configured to receive one or more pieces of capability information corresponding one-to-one to one or more transceiver channels of the terminal device.

The processing unit 1302 is configured to configure the uplink component carrier and the downlink component carrier for the one or more transceiver channels of the terminal device based on the one or more pieces of capability information corresponding one-to-one to the one or more transceiver channels of the terminal device.

Figure 14:
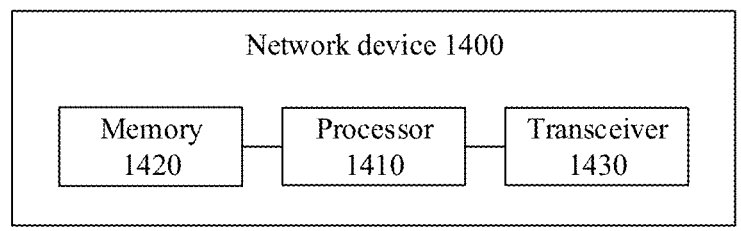
FIG. 14 is another schematic block diagram of a network device according to an embodiment of this application.

As shown in FIG. 14, an embodiment of this application further provides a network device 1400. The network device 1400 includes a processor 1410, a memory 1420, and a transceiver 1430.

In one embodiment, the memory 1420 stores instructions, a program, or data, and the memory 1420 may be configured to implement a function of the storage unit 1301 in the foregoing embodiment. The processor 1410 is configured to read the instructions, program, or data stored in the memory 1420. When the instructions or program stored in the memory 1420 are/is executed, the processor 1410 is configured to perform an operation performed by the processing unit 1302 in the foregoing embodiment, and the transceiver 1430 is configured to perform an operation performed by the transceiver unit 1303 in the foregoing embodiment.

It should be understood that the network device 1300 or the network device 1400 in the embodiments of this application may correspond to the network device in the communication method (FIG. 7 or FIG. 10) in the embodiments of this application, and operations and/or functions of the modules in the network device 1300 or the network device 1400 are separately used to implement corresponding procedures of the method in FIG. 7 or FIG. 10. For brevity, details are not described herein again.

An embodiment of this application further provides a communication apparatus. The communication apparatus may be a terminal device or a circuit. The communication apparatus may be configured to execute an action executed by the terminal device in the foregoing method embodiments.

Figure 15:
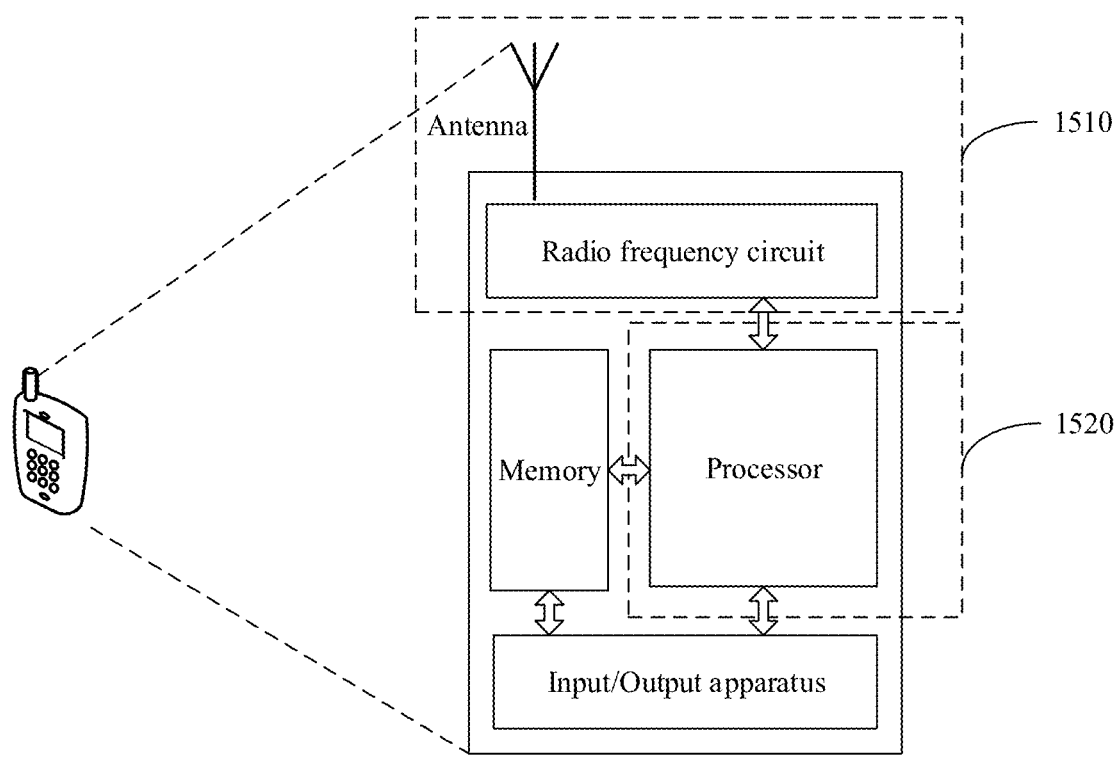
FIG. 15 is a schematic diagram of a structure of a terminal device according to an embodiment of this application.

When the communication apparatus is a terminal device, FIG. 15 is a simplified schematic diagram of a structure of the terminal device. For ease of understanding and illustration, an example in which the terminal device is a mobile phone is used in FIG. 15. As shown in FIG. 15, the terminal device includes a processor, a memory, a radio frequency circuit, an antenna, and an input/output apparatus. The processor is mainly configured to: process a communication protocol and communication data, control the terminal device, execute a software program, process data of the software program, and so on. The memory is mainly configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user. It should be noted that some types of terminal devices may have no input/output apparatus.

When data needs to be sent, the processor performs baseband processing on the to-be-sent data and then outputs a baseband signal to the radio frequency circuit. The radio frequency circuit performs radio frequency processing on the baseband signal and then sends the radio frequency signal to the outside in a form of an electromagnetic wave via the antenna. When data is sent to the terminal device, the radio frequency circuit receives a radio frequency signal via the antenna, converts the radio frequency signal into a baseband signal, and outputs the baseband signal to the processor. The processor converts the baseband signal into data, and processes the data. For ease of description, only one memory and one processor are shown in FIG. 15. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit (or a communication unit) of the terminal device, and the processor having a processing function may be considered as a processing unit of the terminal device. As shown in FIG. 15, the terminal device includes a transceiver unit 1510 and a processing unit 1520. The transceiver unit may also be referred to as a transceiver, a transceiver, a transceiver apparatus, or the like. The processing unit may also be referred to as a processor, a processing board, a processing module, a processing apparatus, or the like. In one embodiment, a component that is in the transceiver unit 1510 and that is configured to implement a receiving function may be considered as a receiving unit, and a component that is in the transceiver unit 1510 and that is configured to implement a sending function may be considered as a sending unit. That is, the transceiver unit 1510 includes the receiving unit and the sending unit. The transceiver unit sometimes may also be referred to as a transceiver, a transceiver, a transceiver circuit, or the like. The receiving unit sometimes may also be referred to as a receiver, a receiver, a receive circuit, or the like. The sending unit sometimes may also be referred to as a transmitter, a transmitter, a transmit circuit, or the like.

It should be understood that the transceiver unit 1510 is configured to perform a sending operation and a receiving operation on a terminal device side in the foregoing method embodiments, and the processing unit 1520 is configured to perform an operation other than the receiving operation and the sending operation of the terminal device in the foregoing method embodiments.

For example, in one embodiment, the transceiver unit 1510 is configured to perform the sending operation and the receiving operation on the terminal device side in S702 in FIG. 7, and/or the transceiver unit 1510 is further configured to perform another receiving operation and sending operation on the terminal device side in the embodiments of this application. The processing unit 1520 is configured to perform S701 in FIG. 7, and/or the processing unit 1520 is further configured to perform another processing operation on the terminal device side in the embodiments of this application.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

In another form of this embodiment, a computer-readable storage medium is provided. The computer-readable storage medium stores instructions. When the instructions are executed, the methods on the terminal device side in the foregoing method embodiments may be performed.

In another form of this embodiment, a computer program product including instructions is provided. When the instructions are executed, the methods on the terminal device side in the foregoing method embodiments may be performed.

In another form of this embodiment, a chip is provided. The chip is coupled to a memory, and is configured to read and execute instructions stored in the memory. When the instructions are executed, the methods on the terminal device side in the foregoing method embodiments may be performed.

Figure 16:
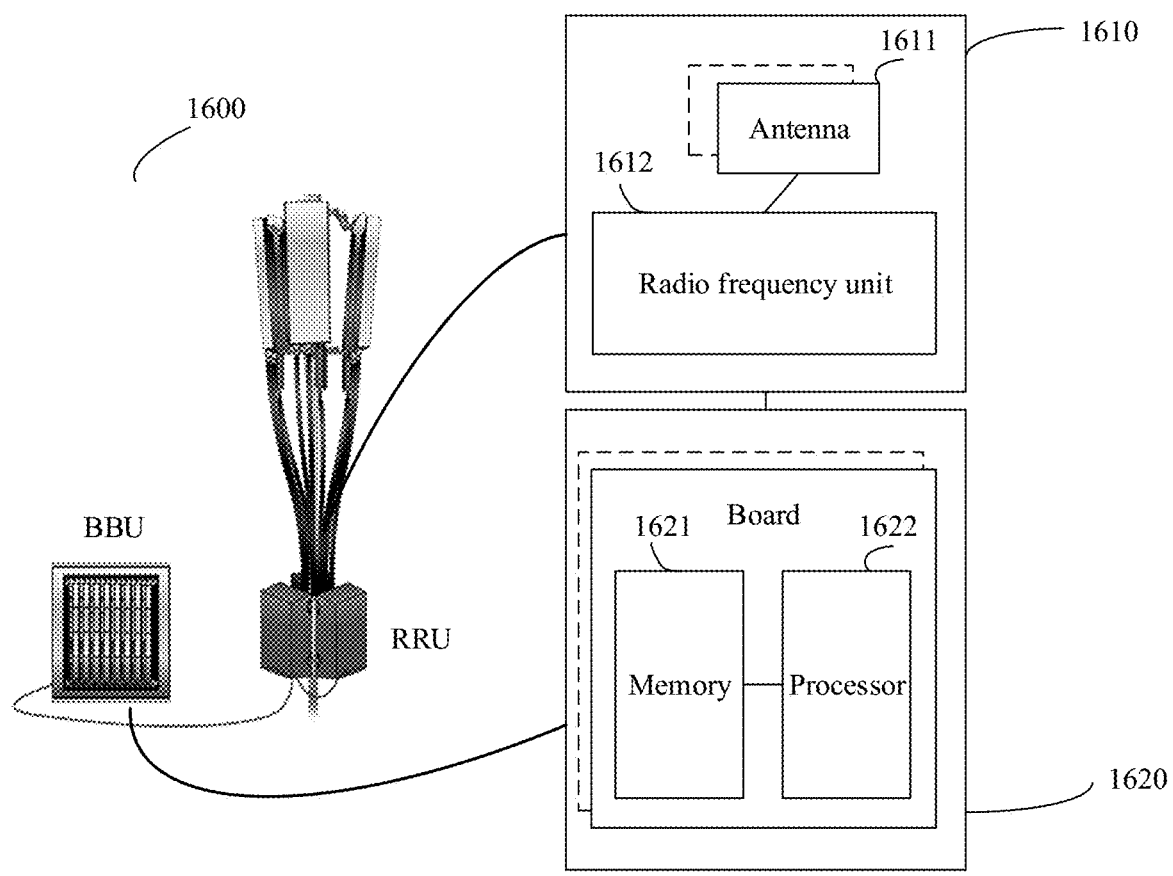
FIG. 16 is a schematic diagram of a structure of a network device according to an embodiment of this application.

When the apparatus in this embodiment is a network device, the network device may be shown in FIG. 16. An apparatus 1600 includes one or more radio frequency units, such as a remote radio unit (RRU) 1610 and one or more baseband units (BBU) (which may also be referred to as digital units (DU)) 1620. The RRU 1610 may be referred to as a transceiver unit, and corresponds to the transceiver unit 1303 in FIG. 13. In one embodiment, the transceiver unit may also be referred to as a transceiver, a transceiver circuit, a transceiver, or the like, and may include at least one antenna 1611 and a radio frequency unit 1612. The RRU 1610 is mainly configured to: receive and send a radio frequency signal, and perform conversion between the radio frequency signal and a baseband signal. For example, the RRU 1610 is configured to send configuration information to a terminal device. The BBU 1620 is mainly configured to: perform baseband processing, control a base station, and so on. The RRU 1610 and the BBU 1620 may be physically disposed together, or may be physically disposed separately, that is, in a distributed base station.

The BBU 1620 is a control center of the base station, and may also be referred to as a processing module. The BBU 1620 may correspond to the processing unit 1302 in FIG. 13, and is mainly configured to implement a baseband processing function, for example, channel coding, multiplexing, modulation, or spreading. For example, the BBU (the processing module) may be configured to control the base station to perform an operation procedure related to the network device in the foregoing method embodiments, for example, generate the foregoing indication information.

In an example, the BBU 1620 may include one or more boards, and a plurality of boards may jointly support a radio access network (for example, an LTE network) having a single access standard, or may separately support radio access networks (for example, an LTE network, a 5G network, or another network) having different access standards. The BBU 1620 further includes a memory 1621 and a processor 1622. The memory 1621 is configured to store instructions and data. The processor 1622 is configured to control the base station to execute a action, for example, an operation procedure related to the network device in the foregoing method embodiments. The memory 1621 and the processor 1622 may serve the one or more boards. In other words, a memory and a processor may be disposed on each board. Alternatively, a plurality of boards may share a same memory and a same processor. In addition, a circuit may further be disposed on each board.

In another form of this embodiment, a computer-readable storage medium is provided. The computer-readable storage medium stores instructions. When the instructions are executed, the methods on the network device side in the foregoing method embodiments may be performed.

In another form of this embodiment, a computer program product including instructions is provided. When the instructions are executed, the methods on the network device side in the foregoing method embodiments may be performed.

In another form of this embodiment, a chip is provided. The chip is coupled to a memory, and is configured to read and execute instructions stored in the memory. When the instructions are executed, the methods on the network device side in the foregoing method embodiments may be performed.

In one embodiment process, the operations of the methods in the embodiments may be implemented by using a hardware integrated logic circuit in a processor or instructions in a form of software. The operations of the methods disclosed with reference to the embodiments of this application may be directly performed and completed by a hardware processor, or may be performed and completed by using a combination of hardware and software modules in the processor.

It should be noted that, the processor in the embodiments of this application may be an integrated circuit chip, and has a signal processing capability. In one embodiment process, the operations in the foregoing method embodiments may be implemented by using a hardware integrated logic circuit in the processor or instructions in a form of software. The processor may be a general-purpose central processing unit (CPU), a general-purpose processor, a digital signal processor (DSP), an application-specific integrated circuit (ASIC), a field programmable gate array (FPGA), another programmable logic device, a transistor logic device, a hardware component, or any combination thereof; or may be a combination of processors implementing a computing function, for example, a combination of one or more microprocessors or a combination of a DSP and a microprocessor. The general-purpose processor may be a microprocessor, or the processor may be any conventional processor, or the like.

It may be understood that the memory or storage unit in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. Through examples but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in this specification includes but is not limited to these and any memory of another proper type.

All or some of the foregoing embodiments may be implemented through software, hardware, firmware, or any combination thereof. When the software is used to implement the embodiments, all or some of the embodiments may be implemented in a form of a computer program product. The computer program product includes one or more computer programs or instructions. When the computer programs or the instructions are loaded and executed on a computer, all or some of procedures or functions in the embodiments of this application are performed. The computer may be a general-purpose computer, a special-purpose computer, a computer network, or another programmable apparatus. The computer programs or the instructions may be stored in a computer-readable storage medium, or may be transmitted through the computer-readable storage medium. The computer-readable storage medium may be any usable medium accessible by a computer, or a data storage device such as a server integrating one or more usable media. The usable medium may be a magnetic medium, for example, a floppy disk, a hard disk, or a magnetic tape; or may be an optical medium, for example, a DVD; or may be a semiconductor medium, for example, a solid state disk (SSD).

The various illustrative logic units and circuits described in the embodiments of this application may implement or operate the described functions through a general-purpose processor, a digital signal processor, an application-specific integrated circuit (ASIC), a field programmable gate array (FPGA), another programmable logic apparatus, a discrete gate or transistor logic device, a discrete hardware component, or an embodiment of any combination thereof. The general-purpose processor may be a microprocessor. In one embodiment, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors with a digital signal processor core, or any other similar configuration.

Operations of the methods or algorithms described in the embodiments of this application may be directly embedded into hardware, a software unit executed by a processor, or a combination thereof. The software unit may be stored in a RAM memory, a flash memory, a ROM, an EPROM, an EEPROM, a register, a hard disk, a removable magnetic disk, a CD-ROM, or a storage medium of any other form in the art. For example, the storage medium may be connected to a processor, so that the processor can read information from the storage medium and write information to the storage medium. In one embodiment, the storage medium may alternatively be integrated into the processor. The processor and the storage medium may be disposed in an ASIC, and the ASIC may be disposed in a terminal device. In one embodiment, the processor and the storage medium may alternatively be disposed in different components of the terminal device.

These computer program instructions may alternatively be loaded onto a computer or another programmable data processing device, so that a series of operations and operations are performed on the computer or the another programmable device, to generate computer-implemented processing. Therefore, the instructions executed on the computer or the another programmable device provide operations for implementing a specified function in one or more processes in the flowcharts and/or in one or more blocks in the block diagrams.

Although the embodiments of this application are described with reference to particular features, it is clear that various modifications and combinations may be made to them without departing from the spirit and scope of the embodiments of this application. Correspondingly, the specification and accompanying drawings are merely example descriptions of the embodiments of this application that are defined by the appended claims, and are considered to cover any or all of modifications, variations, combinations, or equivalents in the scope of the embodiments of this application.

What is claimed is:

1. A communication method comprising:
generating, by a terminal device, capability information, wherein the capability information comprises an overall frequency separation class of the terminal device, and the overall frequency separation class indicates a maximum frequency separation between a lowest component carrier and a highest component carrier comprised in an uplink component carrier and a downlink component carrier supported by the terminal device; and
sending, by the terminal device, the capability information to a network device.

2. The method according to claim 1, wherein the capability information further comprises:
terminal device type indication information, wherein the terminal device type indication information comprises a first terminal device type identifier or a second terminal device type identifier, wherein the first terminal device type identifier indicates that an uplink frequency separation class and a downlink frequency separation class of the terminal device are the same, and the second terminal device type identifier indicates that the uplink frequency separation class and the downlink frequency separation class of the terminal device are different.

3. The method according to claim 2, wherein, when the terminal device type indication information comprises the second terminal device type identifier, the capability information further comprises:
the uplink frequency separation class and the downlink frequency separation class of the terminal device.

4. The method according to claim 1, wherein, the uplink component carrier and the downlink component carrier supported by the terminal device are located in a band combination comprising one or more bands.

5. The method according to claim 1, wherein, the generating, by the terminal device, capability information comprises:
generating, by the terminal device for one or more transceiver channels, one or more pieces of capability information corresponding one-to-one to the one or more transceiver channels.

6. A communication method comprising:
receiving, by a network device, capability information from a terminal device, wherein the capability information comprises an overall frequency separation class of the terminal device, and the overall frequency separation class indicates a maximum frequency separation between a lowest component carrier and a highest component carrier comprised in an uplink component carrier and a downlink component carrier supported by the terminal device; and
configuring, by the network device, the uplink component carrier and the downlink component carrier for the terminal device based on the capability information.

7. The method according to claim 6, wherein, the capability information further comprises:
terminal device type indication information, wherein the terminal device type indication information comprises a first terminal device type identifier or a second terminal device type identifier, wherein the first terminal device type identifier indicates that an uplink frequency separation class and a downlink frequency separation class of the terminal device are the same, and the second terminal device type identifier indicates that the uplink frequency separation class and the downlink frequency separation class of the terminal device are different.

8. The method according to claim 7, wherein, when the terminal device type indication information comprises the second terminal device type identifier, the capability information further comprises:
the uplink frequency separation class and the downlink frequency separation class of the terminal device.

9. The method according to claim 6, wherein, the uplink component carrier and the downlink component carrier supported by the terminal device are located in a band combination comprising one or more bands.

10. The method according to claim 6, wherein, the receiving, by the network device, capability information from the terminal device comprises:
receiving, by the network device, one or more pieces of capability information corresponding one-to-one to one or more transceiver channels of the terminal device; and
the configuring, by the network device, the uplink component carrier and the downlink component carrier for the terminal device based on the capability information comprises:
configuring, by the network device, the uplink component carrier and the downlink component carrier for the one or more transceiver channels of the terminal device based on the one or more pieces of capability information corresponding one-to-one to the one or more transceiver channels of the terminal device.

11. A communication apparatus comprising:
at least one processor; and
a memory storing programming instructions for execution by the at least one processor, the programming instructions instructing the communication apparatus to perform operations comprising:
generating capability information, wherein the capability information comprises an overall frequency separation class, and the overall frequency separation class indicates a maximum frequency separation between a lowest component carrier and a highest component carrier comprised in an uplink component carrier and a downlink component carrier that are supported; and
sending the capability information to a network device.

12. The communication apparatus according to claim 11, wherein, the capability information further comprises:
terminal device type indication information, wherein the terminal device type indication information comprises a first terminal device type identifier or a second terminal device type identifier, wherein the first terminal device type identifier indicates that an uplink frequency separation class and a downlink frequency separation class are the same, and the second terminal device type identifier indicates that the uplink frequency separation class and the downlink frequency separation class are different.

13. The communication apparatus according to claim 12, wherein, when the terminal device type indication information comprises the second terminal device type identifier, the capability information further comprises:
the uplink frequency separation class and the downlink frequency separation class.

14. The communication apparatus according to claim 11, wherein, the uplink component carrier and the downlink component carrier that are supported are located in a band combination comprising one or more bands.

15. The communication apparatus according to claim 11, wherein, the generating operation comprises:
generating, for one or more transceiver channels, one or more pieces of capability information corresponding one-to-one to the one or more transceiver channels.

16. A communication apparatus comprising:
at least one processor; and
a memory storing programming instructions for execution by the at least one processor, the programming instructions instructing the communication apparatus to perform operations comprising:
receiving capability information from a terminal device, wherein the capability information comprises an overall frequency separation class of the terminal device, and the overall frequency separation class indicates a maximum frequency separation between a lowest component carrier and a highest component carrier comprised in an uplink component carrier and a downlink component carrier supported by the terminal device; and
configuring the uplink component carrier and the downlink component carrier for the terminal device based on the capability information.

17. The communication apparatus according to claim 16, wherein, the capability information further comprises:
terminal device type indication information, wherein the terminal device type indication information comprises a first terminal device type identifier or a second terminal device type identifier, wherein the first terminal device type identifier indicates that an uplink frequency separation class and a downlink frequency separation class of the terminal device are the same, and the second terminal device type identifier indicates that the uplink frequency separation class and the downlink frequency separation class of the terminal device are different.

18. The communication apparatus according to claim 17, wherein, when the terminal device type indication information comprises the second terminal device type identifier, the capability information further comprises:
the uplink frequency separation class and the downlink frequency separation class of the terminal device.

19. The communication apparatus according to claim 16, wherein, the uplink component carrier and the downlink component carrier supported by the terminal device are located in a band combination comprising one or more bands.

20. The communication apparatus according to claim 16, wherein, the receiving operation comprises receiving one or more pieces of capability information corresponding one-to-one to one or more transceiver channels of the terminal device; and
the configuring comprises configuring the uplink component carrier and the downlink component carrier for the one or more transceiver channels of the terminal device based on the one or more pieces of capability information corresponding one-to-one to the one or more transceiver channels of the terminal device.

* * * * *